(12) United States Patent
Kataoka et al.

(10) Patent No.: US 6,256,976 B1
(45) Date of Patent: Jul. 10, 2001

(54) EXHAUST GAS RECIRCULATION TYPE COMBINED PLANT

(75) Inventors: Masaki Kataoka; Motoaki Utamura; Takaaki Kuwahara, all of Hitachi (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 09/104,230

(22) Filed: Jun. 25, 1998

(30) Foreign Application Priority Data

Jun. 27, 1997 (JP) .................................................. 9-171466

(51) Int. Cl.[7] ................................. F02C 3/00; F02C 7/08
(52) U.S. Cl. ........................ 60/39.05; 60/39.52; 60/39.53
(58) Field of Search .............................. 60/39.02, 39.05, 60/39.52, 39.53

(56) References Cited

U.S. PATENT DOCUMENTS

| 3,703,807 | * | 11/1972 | Rice | 60/39.52 |
| 4,133,171 | * | 1/1979 | Earnest et al. | 60/39.52 |
| 4,204,401 | * | 5/1980 | Earnest | 60/39.52 |
| 4,667,465 | * | 5/1987 | Munk | 60/39.53 |
| 4,702,074 | * | 10/1987 | Munk | 60/39.53 |
| 4,731,990 | * | 3/1988 | Munk | 60/39.05 |
| 5,353,585 | * | 10/1994 | Munk | 60/39.05 |
| 5,867,977 | * | 2/1999 | Zachery et al. | 60/39.05 |
| 5,930,990 | * | 8/1999 | Zachary et al. | 60/39.05 |

FOREIGN PATENT DOCUMENTS

| 56-141040 | 11/1981 | (JP) . |
| 7-34900 | 2/1995 | (JP) . |

* cited by examiner

*Primary Examiner*—Charles G. Freay
(74) *Attorney, Agent, or Firm*—Mattingly, Stanger & Malur

(57) ABSTRACT

An exhaust gas recirculation type gas turbine apparatus includes a compressor for compressing air, a combustion chamber for burning fuel and compression air exhausted from the compressor, a gas turbine driven by exhaust gas from the combustion chamber, a recirculation path for recirculating a part of the exhaust gas to an intake of the compressor, a recirculation amount control unit for adjusting the amount of exhaust gas to be returned to the intake of the compressor corresponding to a change in load of the gas turbine, and a spray unit for introducing liquid droplets into the interior of the compressor in which mixing gas, consisting of gas turbine exhaust gas passing through the recirculation path and air, flows so as to vaporize the introduced liquid droplets appearing to flow in the compressor.

1 Claim, 17 Drawing Sheets

EXHAUST GAS RECIRCULATION TYPE COMBINED PLANT

BACKGROUND OF THE INVENTION

1. Field of the Invention

This invention relates to a gas turbine apparatus, and more particularly to a exhaust gas recirculating type combined cycle plant wherein exhaust gas is recirculated to an air intake side of a compressor.

2. Description of Related Art

Japanese Unexamined Patent Application No. Hei7-34900 disclosed an exhaust gas recirculating type combined plant wherein a part of exhaust gas from a gas turbine is returned to an air intake of a compressor so as to raise a compressor air intake temperature so that a combustion temperature at the time of partial loading or gas turbine exhaust gas temperature is prevented from dropping thereby preventing a drop in cycle heat efficiency at the time of the partial loading.

Further, according to Japanese Unexamined Patent Application No. Sho 56-141040, before recirculated combustion gas enters a compressor, water is sprayed so that it is vaporized. A cooling unit is provided on a compression air path out of the compressor and by supplying coolant medium, heat is recovered so that a rate of heat recovery from exhaust gas is improved.

However, the Japanese Unexamined Patent Application No. Hei7-34900 does not disclosed anything about widening a range in which high efficiency partial load operation is enabled by stabilized recirculation of exhaust gas. Further, Japanese Unexamined Patent Application No. Sho56-141040 does not mention anything about a partial load operation.

The combined cycle plant has such a feature that there exists an atmospheric temperature maximizing its plant efficiency and the plant efficiency drops at other temperatures than the atmospheric temperature.

SUMMARY OF THE INVENTION

An object of the present invention is to provide an exhaust gas recirculation type gas turbine apparatus having a wide partial load operation range allowing high efficiency operation.

Another object of the present invention is to provide an exhaust gas recirculation type gas turbine apparatus capable of obtaining a desired output efficiently even when the external temperature changes.

To solve the aforementioned problem, the first invention provides an exhaust gas recirculation type gas turbine apparatus comprising: a compressor for compressing air; a combustion chamber for burning compression air exhausted from the compressor and fuel; a gas turbine driven by gas turbine exhaust gas from the combustion chamber; a recirculation path for recirculating a part of the gas turbine exhaust gas to an intake of the compressor; a recirculation amount control unit for adjusting an amount of gas turbine exhaust gas to be returned to the intake of the compressor corresponding to a change in load of the gas turbine; and a spray unit for introducing liquid droplets into an interior of the compressor in which mixing gas comprising gas turbine exhaust gas passing through the recirculation path and air flows so as to vaporize the introduced liquid droplet during a flow in the compressor.

As a result, air is compressed in the compressor, the compressed air and fuel are burned in the combustion chamber, the gas turbine is driven with gas turbine exhaust gas from the combustion chamber, a part of the gas turbine exhaust gas is recirculated to the intake of the compressor through the recirculation path, the amount of the gas turbine exhaust gas to be returned to the intake of the compressor is adjusted corresponding to a change in the load of the gas turbine, and liquid droplets are sprayed from the spray unit so as to introduce the liquid droplets into the compressor in which mixing gas comprising gas turbine exhaust gas passing through said recirculation path and air flows so that the introduced liquid droplets are vaporized during a flow in the compressor.

Because of vaporizing the liquid droplets in the compressor, a rise of the compressor exit temperature is suppressed so that the temperature of the mixing gas entering the compressor is raised, the recirculation amount can be increased and further the heat efficiency in the compressor can be improved. As a result, the partial load operation range in which the compressor can be operated efficiently can be widened.

According to an embodiment of the present invention, the gas turbine exhaust gas recirculation type gas turbine apparatus comprises: a compressor for compressing air; a combustion chamber for burning compression air exhausted from the compressor and fuel; a gas turbine driven by gas turbine exhaust gas from the combustion chamber; a recirculation path for recirculating a part of the gas turbine exhaust gas to an intake of the compressor; a recirculation amount control unit for adjusting an amount of gas turbine exhaust gas to be returned to the intake of the compressor corresponding to a change in load of the gas turbine; and a spray unit for spraying liquid droplets over air supplied to the compressor and gas turbine exhaust gas passing through said recirculation path so as to introduce the liquid droplets into the compressor in which the air and the gas turbine exhaust gas flow so that the introduced liquid droplets are vaporized during a flow in said compressor. As a result, in addition to the aforementioned matter, it is possible to vaporize the liquid droplets at a relative upstream portion in the compressor so that the temperature in the compressor can be continuously changed.

While suppressing a rise of the compressor exit temperature by vaporizing the liquid droplets in the compressor, the temperature of the mixing gas entering the compressor can be raised, resulting in the increase of the recirculation amount. Further, the improvement of the heat efficiency in the compressor allows the partial load operation range allowing a high efficiency operation of the compressor to be widened.

The second invention provides an exhaust gas recirculation type gas turbine apparatus comprising: a compressor for compressing air; a combustion chamber for burning compression air exhausted from the compressor and fuel; a gas turbine driven by gas turbine exhaust gas from the combustion chamber; a recirculation path for recirculating a part of the gas turbine exhaust gas to an intake of the compressor; a recirculation amount control unit for adjusting an amount of gas turbine exhaust gas to be returned to the intake of the compressor corresponding to a change in load of the gas turbine; a spray unit for introducing liquid droplets into an interior of the compressor in which mixing gas comprising gas turbine exhaust gas passing through the recirculation path and air flows so as to vaporize the introduced liquid droplet during a flow in said compressor; and a spray amount control unit for controlling a spray amount of the liquid droplets corresponding to the recirculation amount.

While suppressing a rise of the compressor exit temperature by vaporizing the liquid droplets in the compressor, the temperature of the mixing gas entering the compressor can be raised, resulting in the increase of the recirculation amount. Further, because the heat efficiency in the compressor can be improved, the partial load operation range allowing a high efficiency operation of the compressor can be widened.

The compressor intake temperature and exit temperature change are dependent on the recirculation amount, and thereby the spray amount can be appropriately adjusted.

As a result, by spraying the liquid droplets to intake air introduced into the compressor on demand by means of a simple apparatus suitable for the actual purpose so that the introduced liquid droplets are vaporized in the compressor, the widening of the partial load operation range and improvement of the efficiency of the combined cycle plant can be achieved.

The third invention provides an exhaust gas recirculation type gas turbine apparatus comprising: a compressor for compressing air; a combustion chamber for burning compression air exhausted from the compressor and fuel; a gas turbine driven by gas turbine exhaust gas from the combustion chamber; a recirculation path for recirculating a part of the gas turbine exhaust gas to an intake of the compressor; a spray unit for introducing liquid droplets into an interior of the compressor in which mixing gas comprising gas turbine exhaust gas passing through the recirculation path and air flows so as to vaporize the introduced liquid droplets during a flow in the compressor; a temperature detector for detecting a temperature of air supplied to the compressor; and a control unit for controlling so that in the case of a first temperature region in which the detected temperature is set, the recirculation is executed and the spray of droplets from the spray unit is stopped. In the case of a second temperature region which is higher than the first temperature region, the recirculation is executed and the spray of droplets from the spray unit is executed and in the case of a third temperature region which is higher than the second temperature region, the recirculation is stopped and the spray of droplets from the spray unit is executed.

This will easily provide a desired load efficiently regardless of the change of external temperature.

An exhaust gas recirculation type gas turbine apparatus is preferred to comprise a control unit for controlling a spray amount of droplets from said spray unit depending on a humidity of air supplied to the compressor.

In place of the third invention's control unit, the fourth invention provides an exhaust gas recirculation type gas turbine apparatus comprising: a control unit for controlling operation so that in the case of a first temperature region in which the detected temperature is set, the recirculation is executed and spray of droplets from the spray unit is stopped, in the case of a second temperature region which is higher than the first temperature region, the recirculation is stopped and the spray of droplets from the spray unit is stopped and in the case of a third temperature region which is higher than the second temperature region, said recirculation is stopped and the spray of droplets from the spray unit is executed.

This will easily provide a desired output efficiently regardless of the change of the external temperature.

An exhaust gas recirculation type gas turbine apparatus is preferred to comprise a control unit for controlling a spray amount of droplets from said spray unit depending on a humidity of air supplied to the compressor.

An exhaust gas recirculation type gas turbine apparatus is also provided further comprising a control unit for controlling a spray amount of droplets from said spray unit depending an a humidity of air supplied to the compressor.

According to a fifth aspect of the invention, there is provided an exhaust gas recirculation type gas turbine apparatus comprising: a compressor for compressing air; a gas turbine chamber for burning compression air exhausted from the compressor and fuel; a gas turbine driven by gas turbine exhaust gas from the gas turbine chamber; a recirculation path for recirculating a part of the gas turbine exhaust gas to an intake of the compressor; and a carbon dioxide gas removing unit installed in a flow path of gas turbine exhaust gas for reducing the concentration of carbon dioxide gas in the gas turbine exhaust gas discharged after air containing the recirculated exhaust gas is introduced to the gas turbine chamber.

As a result, carbon dioxide (e.g., $CO_2$) can be removed effectively while achieving a high efficiency operation. Further, the size of the carbon dioxide removing unit can be reduced. Because the pressure loss of the gas turbine exhaust path can be reduced by the miniaturization, the efficiency drop during the gas turbine operation can be suppressed thereby contributing to the high efficiency operation.

The carbon dioxide gas removing measure can be disposed between a diverging portion of the recirculation path of the gas turbine exhaust gas path and an emitting portion for emitting the gas turbine exhaust gas. As a result, the gas turbine exhaust gas containing high concentration carbon dioxide gas can be removed, so that the carbon dioxide gas removing efficiency can be maintained at a high level in addition to the aforementioned effect. Further, because the pressure loss can be further reduced, the high efficiency operation is enhanced.

Alternatively the carbon dioxide gas removing measure can be disposed between the gas turbine of the gas turbine exhaust gas path and the diverging portion of the recirculation path. As a result, a large amount of the gas turbine exhaust gas can be supplied so that the carbon dioxide gas removing efficiency can be maintained at a high level in addition to the aforementioned effect.

Moreover, the carbon dioxide gas removing measure can be disposed on the recirculation path. As a result, the carbon dioxide gas removing unit can be installed easily. Further, the maintenance work for this unit is facilitated. Further, the pressure loss at a discharge portion of exhaust gas to the air can be reduced, the efficiency drop of the gas turbine can be further suppressed.

BRIEF DESCRIPTION OF THE DRAWINGS

Other features and advantages of the invention will be apparent from the following description taken in connection with the accompanying drawing wherein.

DETAILED DESCRIPTION OF PREFERRED EMBODIMENTS

Figure 1:
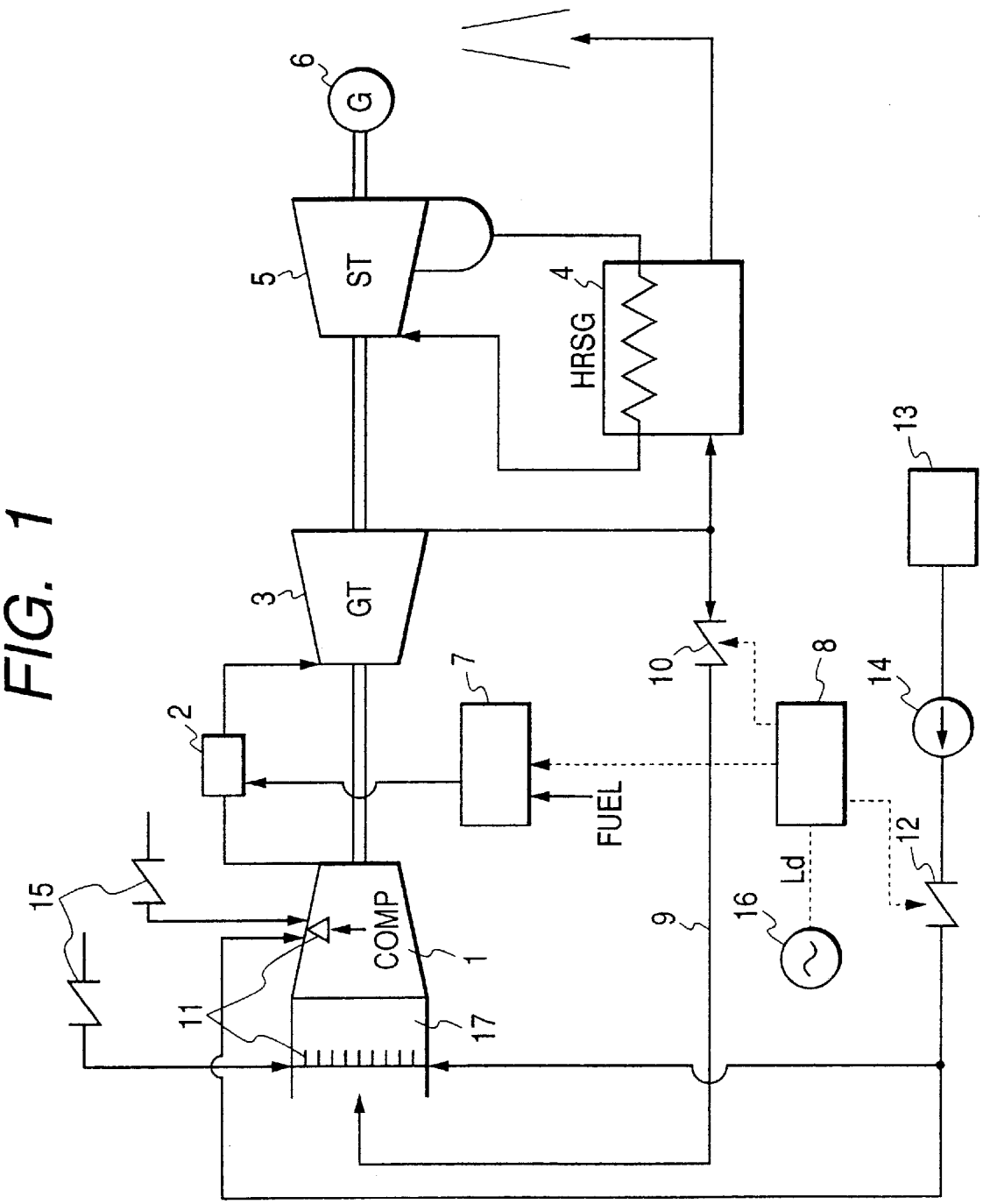
FIG. 1 is a schematic diagram of an embodiment of the present invention.

FIG. 1 shows a first embodiment of the present invention. An exhaust gas recirculating type combined plant employing a gas turbine intake air water spraying system comprises: a compressor (compressor) 1 for sucking and compressing air, a combustion chamber 2 for mixing and burning the compressed air and fuel; a gas turbine 3 which is driven by combustion gas supplied from the combustion chamber 2; an exhaust heat recovery boiler 4 for recovering heat of the gas turbine exhaust gas from the gas turbine 3 so as to generate steam by heat exchange with supplied water; a steam turbine 5 which is driven by the steam generated by the gas turbine exhaust heat recovery boiler 4; a generator 6 coupled with the steam turbine 5; a recirculating means (pipe) 9 composing a recirculating path for taking out part of the gas turbine exhaust gas of the gas turbine 3 and recirculating it up to a compressor intake; and a recirculation amount control means (exhaust gas recirculation amount adjusting valve) 10 for controlling the recirculation amount.

Referring to FIG. 1, although the compressor 1, gas turbine 3, steam turbine 5 and generator 6 are connected on a same axis, it is permissible to construct them so that each turbine may drive a generator.

This combined plant further comprises a fuel amount control valve (fuel supply system) 7 for controlling an amount of fuel supplied to the combustion chamber 2 and an integrated control device 8 for controlling the fuel amount control valve 7 and the recirculation amount control means 10.

According to the first embodiment, spray nozzles 11 for spraying fine droplets of liquid are disposed in a suction duct 17. A supply water amount adjusting valve 12 for controlling a spray amount, a water tank 13 for storing water and a water supply pump 14 are disposed on a path for supplying water to the spray nozzles. If the aforementioned nozzle requires an air supplying means for obtaining fine liquid droplets, an air flow adjusting valve 15 is disposed on a suction air supply path.

As for the fine droplets of liquid sprayed, their average droplet diameter (S.M.D.) is about 10 μm.

Generation output of the aforementioned combined plant is operated by the fuel amount control valve 7 for controlling an amount of fuel loaded in the combustion chamber 2, recirculation amount control means 10, spray amount (supply water amount) adjusting valve 12, air flow adjusting valve 15 and determined by adjusting their opening degrees. These operation ends are controlled depending on an operation signal from the integrated control device 8. The integrated control device 8 receives a load request signal Ld from a central power supply control room 16 for the combined plant and controls the entire plant so as to appropriately control air amount, fuel amount and spray amount.

Figure 2:
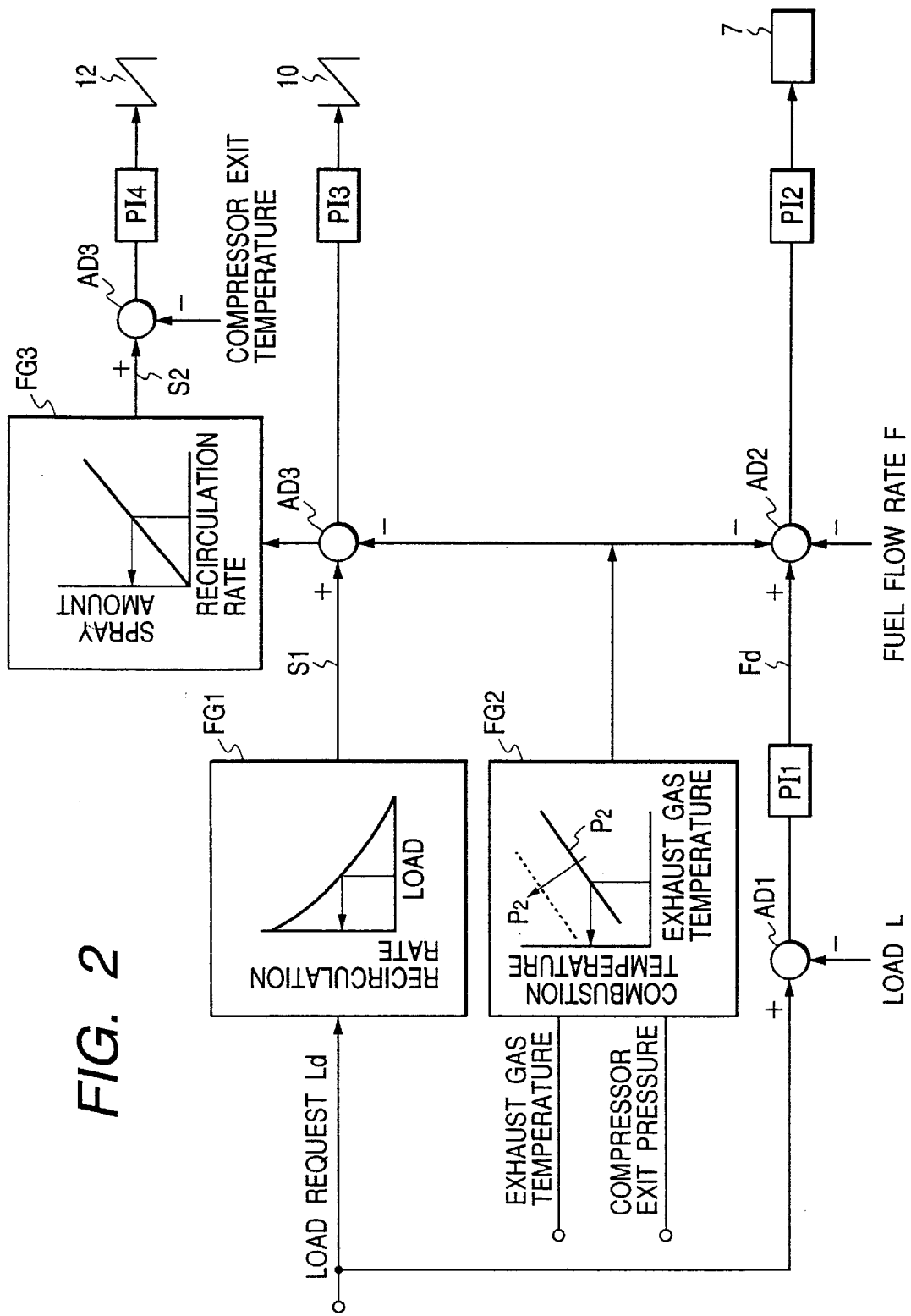
FIG. 2 is a schematic diagram for explaining a control of an integrated control apparatus.

An example of the integrated control device will be described with reference to FIG. 2, To control an amount of fuel, first a deviation between a load request signal Ld and an actual load L is obtained by a subtractor AD1 and a fuel target signal Fd is obtained by an adjusting device PI1. Then, a deviation between the fuel target signal Fd and actual fuel amount F is obtained by a subtractor AD2 and then the fuel amount control valve 7 is adjusted by the adjusting device PI2 to determine an amount of fuel to be loaded on the combustion chamber. According to this control, the larger the load, the larger the amount of fuel is supplied to the combustion chamber 2.

As for the control of a recirculating amount, in a function generator FG1 which receives the load signal Ld, the smaller the load, the larger an output signal S1 is obtained. This signal S1 is supplied to the adjusting device PI3 so as to control the recirculation amount control means 10.

When an operational value of combustion temperature is input to AD2 or AD3 and the AD2 or AD3 makes arithmetic operation, correction is carried out as required to suppress a deflection of the combustion temperature. As for the operational value of the combustion temperature, exhaust gas temperature and compressor exit pressure are input to FG2, in which a combustion temperature is calculated based on the gas turbine exhaust gas temperature and pressure and then output.

As the load decreases, the recirculation amount increases in terms of supplying speed, preventing a reduction of the combustion temperature or gas turbine exhaust gas temperature accompanied by a reduction of the load. Preferably, the combustion temperature (gas turbine exhaust gas temperature) can be maintained at a substantially constant level regardless of the load. In the function generator FG1 of FIG. 2, a recirculation rate of the gas turbine exhaust gas amount is determined corresponding to the load. Thus, in the example shown in the same figure, the output signal S1 of the function generator FC1 can maintain the gas turbine exhaust gas temperature substantially constant regardless of the load.

Like this, by recovering entropy of exhaust gas, reduction of efficiency at the time of the partial loading can be prevented.

In this manner, the gas turbine exhaust gas temperature can be maintained at a substantially constant level regardless of the load.

Figure 3:
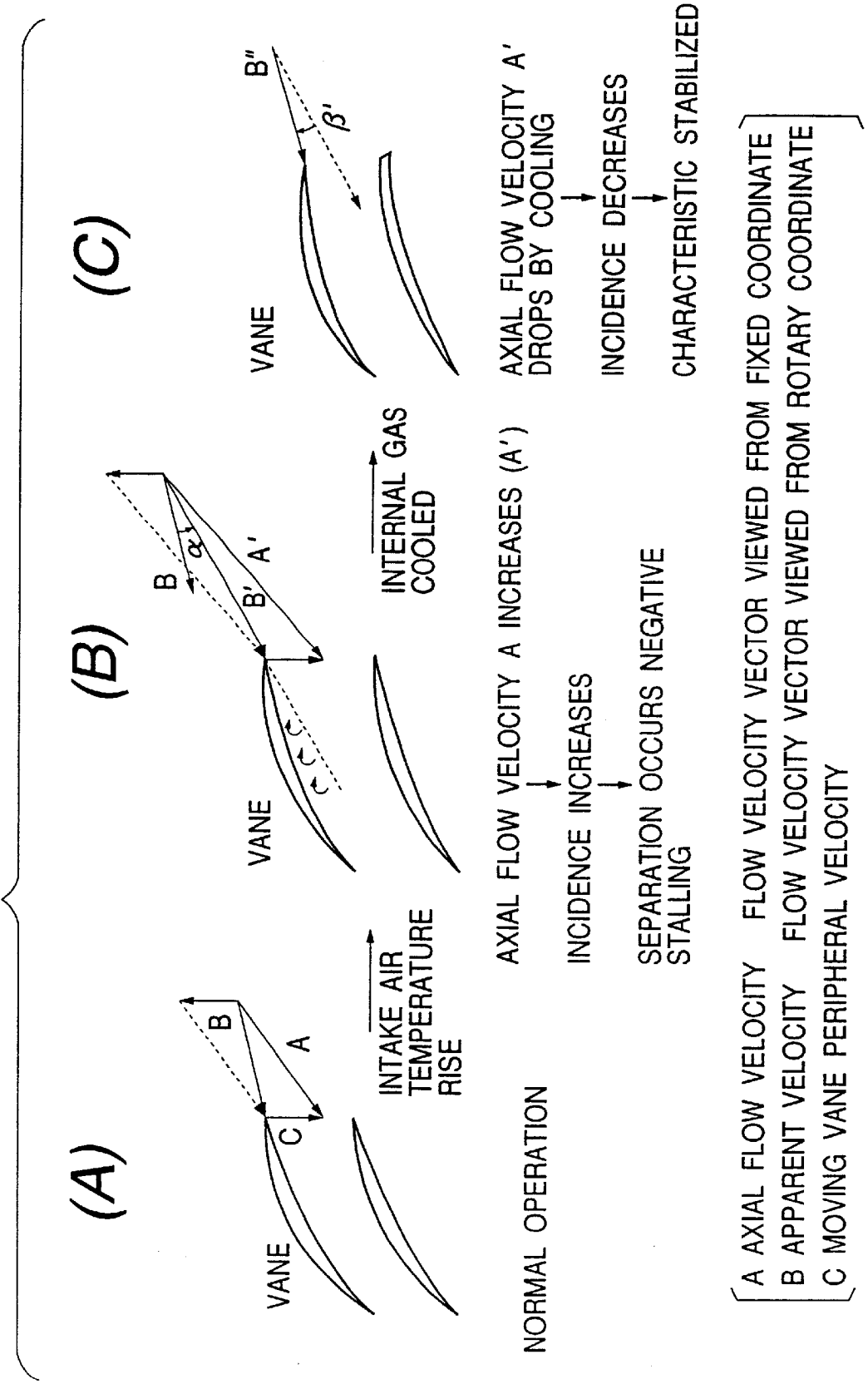
FIG. 3 is a diagram showing fluid behavior in the vicinity of a vane in the compressor.

As for improvement of compressor characteristics, to prevent a drop of the combination temperature at the time of the partial load operation or a reduction of the gas turbine exhaust gas temperature, outside air of atmospheric temperature is mixed with high temperature gas turbine exhaust gas at the compressor intake so as to obtain intake air. As the load is decreased, the gas turbine exhaust gas amount to be recirculated increases. Then, as the gas turbine exhaust gas increases, naturally the suction air temperature also increases, so that correspondingly, a temperature in the compressor 1 also increases. As shown in FIG. 3, fluid behavior in the vicinity of compressor vanes changes. Generally, a peripheral velocity or a moving vane inside the compressor is constant. If an axial velocity is designed so as to be constant, an apparent velocity B flowing to the compressor moving vane is parallel to the vane as shown in (A). However, if the suction air temperature rises so that the gas temperature inside the compressor also rises, an incidence α which is an incidence angle of the apparent velocity B is increased to increase the axial velocity A' as shown in (B). Thus, at a compressor rear end in which the temperature rises (e.g., near the final stage moving vane), flow separation occurs on the vane so as to produce stalling. If this phenomenon is serious, a negative stalling is caused, so that a stable operation of the gas turbine becomes impossible. Thus, even if the recirculating amount is increased accompanied by a reduction of the gas turbine load, there exists a upper limit of the gas turbine exhaust gas recirculating amount thereby a range of the partial load operation being limited.

According to the present embodiment, liquid droplets to be vaporized in the compressor are introduced into the suction air in which the outside air of atmospheric temperature and high temperature gas turbine exhaust gas are mixed with each other. As a result, as shown in FIG, 3(C), internal gas of the compressor is cooled so that the axial velocity A' is reduced at the rear end of the compressor. consequently, the incidence α is also reduced so that the apparent velocity B becomes parallel to the vane thereby stabilizing the compressor characteristic. Because the internal gas of the compressor can be cooled by vaporization of liquid droplets inside the compressor, the compressor suction air temperature can be further increased. That is, because the gas turbine exhaust air recirculation amount can be increased more, the high efficiency partial load operation range can be expanded.

Figure 4:
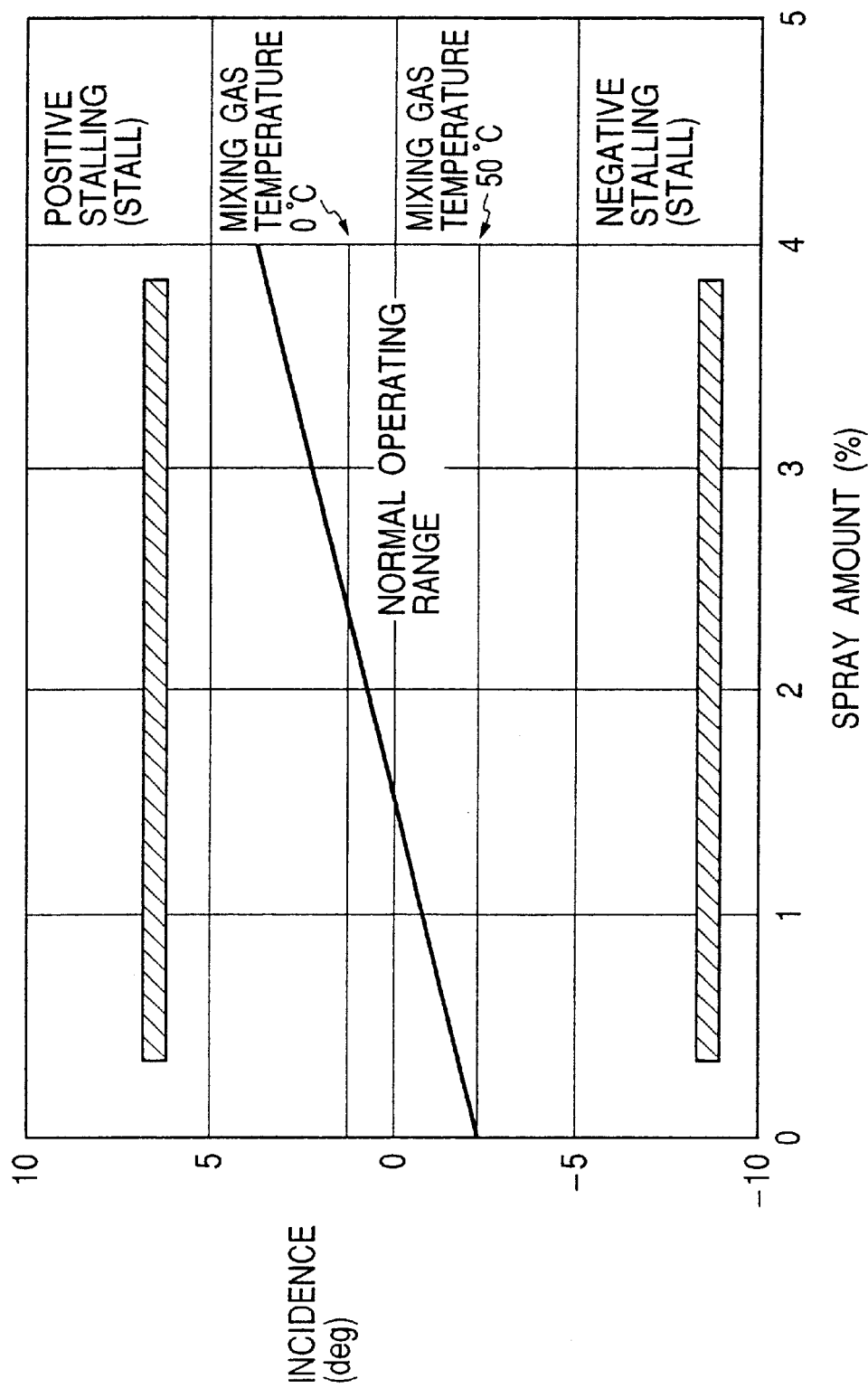
FIG. 4 is a diagram showing a change in incidence in the compressor due to water spray.

FIG. 4 shows a change in incidence relative to the spray amount. Ordinarily, the gas turbine is designed so as to be operated under an atmospheric temperature of 0° C.–50° C. In this interval, the characteristic of the compressor is stabilized regardless of the incidence being changed by a change in the compressor suction air temperature. However, if the compressor suction air temperature exceeds this range, the absolute value of the incidence is increased, so the characteristic of the compressor becomes unstable. At the worst, a positive stalling (stall) or a negative stalling (choke) may occur.

According to the present invention, by introducing the liquid droplets to be vaporized into the interior of the compressor, the internal gas inside the compressor is cooled so as to improve the incidence. Referring to FIG. 4, although the incidence is at the lower limit of the regular operation range when the suction air temperature is 50° C., by spraying liquid droplets at the compressor intake so as to cool the internal gas inside the compressor, the incidence is gradually restored, resulting in the incidence being restored to 0 deg with a spray amount of 1.5%. If the spray amount is increased, the problematic positive stalling (stall) requires an appropriate spray amount to be selected.

As described above, introducing the liquid droplets to be vaporized in the compressor causes a temperature difference between the compressor intake gas and exit gas to be minimized. The intake temperature is substantially constant and the exit temperature drops or the reduction amount of the exit temperature is made larger than the reduction amount of the intake temperature.

Therefore, the recirculation amount can be increased with the compressor exit temperature being substantially constant.

Thus, the recirculation can be attained even at the time of low partial load operation.

By introducing liquid droplets to be vaporized in the compressor in which the aforementioned mixing gas flows so that the liquid droplets are vaporized in the compressor, the efficiency under the partial load can be improved as compared to the case of the aforementioned conventional art. The water droplets entering the compressor are vaporized and if the vaporization is completed, the gas in the compressor is subjected to adiabatic compression. At that time, the specific heat under a constant pressure of steam is about twice that of the mixing gas around a typical temperature (300° C.) in the compressor and therefore, in terms of thermal capacity, if calculated on the basis of the mixing gas, the same effect is produced as when the mixing gas having a weight about twice that of water droplets to be vaporized acts as an operating liquid. That is, a drop of the mixing gas temperature at the exit of the compressor has an effect (temperature rise inhibit effect). The vaporization of water droplets in the compressor like this causes the drop of the mixing gas temperature at the exit of the compressor. An operating power of the compressor is equal to a difference of mixing gas entropy between the intake and exit of the compressor and the mixing gas entropy is proportional to the temperature. Thus, if the mixing gas temperature at the exit of the compressor drops, the required operating power of the compressor can be reduced so that the efficiency can be improved.

If the suction air temperature at the intake of the compressor, temperature at the exit of the compressor, combustion temperature and gas turbine exit temperature are assumed to be $T_1$, $T_2$, $T_3$ and $T_4$ respectively, the gas turbine efficiency η is approximately given in a following expression.

$$\eta = 1 - \frac{T_4 - T_1}{T_3 - T_2} \qquad \text{[Expression 1]}$$

If the compressor exit temperature $T_2$ drops to $T_2'(<T_2)$ due to the vaporization by mixing of sprayed water, a second term of the right side of the above expression becomes smaller, so that it is clear that the efficiency is improved by the water spray. In other words, although the thermal energy $Cp(T_4-T_1)$ thrown out of the gas turbine (a heat engine) does not change largely between before and after the application of the present invention, the fuel energy $Cp(T_3-T_2')$ loaded is increased by $Cp(T_2-T_2')$ or a reduction amount of the compressor work when applying the present invention. Because the reduction amount of the compressor work is equal to an increased output, this increase of the fuel contributes substantially all to an increase of the output of the gas turbine. That is, the increased output attains a heat efficiency of 100%. Therefore, the heat efficiency of the gas turbine can be improved. Because the combustion temperature is maintained at a constant level, the heat efficiency of bottoming cycle is the same as before the present invention has been applied. Therefore, the heat efficiency of the combined cycle total can be improved.

Only reducing the mixing gas temperature introduced into the compressor may slightly improve the characteristic of the compressor as shown in FIG. 4 in a limited manner.

Further, under a low partial load operation, the intake air is cooled so that the weight flow rate of the intake air introduced into the compressor 1 is increased, resulting in the possibility of a increase of the load of the gas turbine to be driven under a low load.

If the diameter of the sprayed liquid droplet is large, it collides with the vane or casing of the compressor 1 so that it is vaporized by receiving a heat from the metal. As a result, the temperature reduction effect of the operating liquid may be obstructed. Thus, the diameter of the liquid droplet is desired to be as small as possible from this viewpoint.

The sprayed liquid droplet has a distribution of the diameters of the droplets. To prevent a collision of the droplets against the vane or casing of the compressor 1 or erosion of the vane, the diameter of the sprayed liquid droplets is controlled so as to be 50 $\mu$m or below. To minimize an effect on the vane, the maximum diameter thereof is desired to be 50 $\mu$m or below.

Because the smaller the diameter of the droplet, the more uniformly the liquid droplets can be distributed in flowing air, so that the distribution of the temperature in the compressor is suppressed, it is desirable that the Sautor average diameter (S.D.M) is 30 $\mu$m or below. Because the liquid droplets ejected from an injection nozzle have a distribution of grain size, the aforementioned maximum diameter is difficult to be measured. Thus, for actual use, the measurement of the aforementioned Sautor average diameter (S.D.M.) is applied. Although the diameter of the droplet is desired to be as small as possible, an injection nozzle for producing a small droplet requires a high precision production technology. Thus, a lower limit allowing technically as small a droplet as possible is an actual range of the aforementioned diameter thereof. Therefore, from such a viewpoint, for the aforementioned main droplet diameter, maximum diameter and average diameter, 1 $\mu$m is a lower limit. Further, the smaller the diameter of the droplets, the more energy is consumed for generating such droplets. Thus, considering the energy to be consumed for generation of the liquid droplets, it is permissible to determine the aforementioned lower limit. If the droplet size is a size allowing it to float in the atmosphere so that it is not likely to drop, generally, the condition of its contact surface is excellent.

A time in which the air passes through the compressor is very short. To vaporize the liquid droplets excellently in this while and intensify the vaporization efficiency, the Sautor average diameter (S.D.M.) is desired to be less than 30 $\mu$m.

Because a high precision production art is required for production of an injection nozzle capable of generating small droplets, the lower limit technically allowing the droplet diameter to be reduced is the lower limit for the aforementioned grain size. For example, such lower limit is 1 $\mu$m.

This is because if the droplet diameter is too large, the vaporization thereof in the compressor is made difficult.

An introduction amount of the droplets can be adjusted depending on the temperature, humidity and an increase of the output. Taking into account an amount of the vaporization of the liquid droplets in an interval from a spraying point to the compressor intake, more than 2 wt % relative to the intake air weight flow rate can be introduced. Its upper limit is determined in a range capable of maintaining the function of the compressor in an excellent condition. For example, it is possible to determine the upper limit to be 5 wt % such that the introduction range is below this value.

Although the introduction range can be adjusted considering summer season and dry condition, to further increase the output, it is possible to introduce at 0.8 wt % or more and 5 wt % or below.

It is permissible to additionally dispose the injection nozzle so as to spray the liquid droplets over compression gas.

Figure 6:
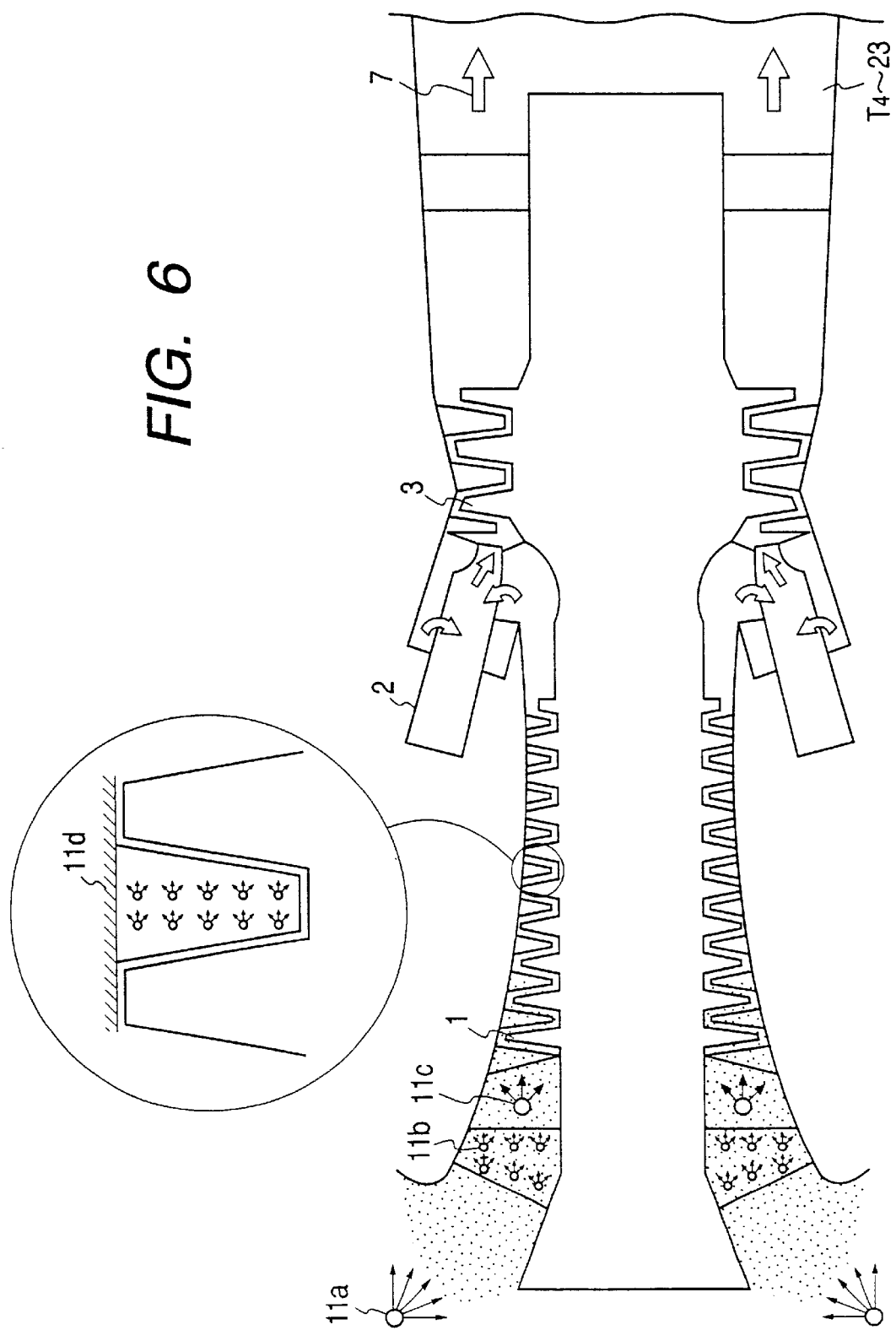
FIG. 6 is a schematic diagram of a spray nozzle.

A position of the spray nozzle 11 will be described with reference to FIG. 6. Here, reference numeral 22 denotes IGV.

The spray nozzle is disposed at any position of 11a–11d. The injection nozzle 11a is disposed via a predetermined distance from the compressor exit. However, if a silencer is disposed within the suction duct 17, it is disposed downstream relative thereto. As a result, if it is intended to not only attain high efficiency partial load operation but also achieve high efficiency increased output operation, favorably, a part of the liquid droplet is vaporized before it is introduced into the compressor and after it is introduced into the compressor, it is further vaporized during a flow in the compressor.

The spray nozzle 11b is disposed on an introduction vane provided most upstream which is an introduction portion of the compressor, provided at the compressor intake. An air supplying path and water supplying path are disposed within the same vane. As a result, a resistance by the spray nozzle to the flow is suppressed and the liquid droplets can be sprayed without providing special space for installation of the nozzle.

A spray nozzle 11c is disposed between the aforementioned guide vane and IGV. This prevents the sprayed liquid droplets from being vaporized before entering the compressor and the weight flow rate of the mixing gas from increasing. From such a viewpoint, it is desirable to install the injection nozzle near the IGV.

By disposition of 11a–11c, continuous vaporization within the compressor can be obtained. Further, by vaporizing as much as possible at a position relatively upstream of the compressor, the compressor exhaust temperature can be reduced, so that a rise of the compressor exhaust temperature can be suppressed.

An injection nozzle 11d is disposed at the middle of the compressor. For fear of the symptom as stalling of the vane of the compressor is more likely to occur at the vane of the rear end, this injection nozzle may be installed at the middle stage of the compressor near the rear end. In this case, the nozzle is installed on a stationary vane as shown by an enlarged view and a water supplying means and air supplying means are provided within the vane.

The sprayed liquid droplets flowing in the compressor move between the vanes of the compressor along its flow line. In the compressor, the intake air is heated by adiabatic compression, so that the liquid droplets are vaporized from the surface by this heat and while the diameter thereof is being reduced, transferred to the rear end vane. In this process, vaporization latent heat required for vaporization lowers the temperature of the mixing gas in the compressor because it depends on the mixing gas in the compressor.

The spray amount of the aforementioned injection nozzle 11 is controlled so as to correspond to a recirculating amount of the combustion gas. For example, it is controlled so that the spray amount is larger when the recirculating amount is large than when the recirculating amount is small.

At the time of the partial load operation of the gas turbine of the combined plant, the mixing gas composed of the gas turbine exhaust gas through the recirculating pipe 9 and air supplied through the suction duct 17 is introduced to the compressor 1 and in the compressor 1, the aforementioned mixing gas is compressed and discharged.

With this condition, the aforementioned fine liquid droplets are sprayed from the aforementioned spray nozzle 11 and introduced into the compressor, and during a flow in the compressor 1, the liquid droplets are vaporized.

By adjusting the spray amount depending on the recirculating amount, the partial load operation range in which a high efficiency operation is enabled by recirculating the gas turbine exhaust gas can be enlarged as compared to carrying out only the gas turbine exhaust gas recirculation.

It is possible to improve the characteristic of the compressor which has been lowered due to a rise of the compressor intake air temperature accompanied by an increase of the recirculation amount at the time of the partial load operation, particularly of low load operation.

A control of the spray amount will be described with reference to FIG. 2.

In this control, an output signal S1 which becomes larger as the load decreases in a function generator FG1 receiving the load request signal Ld and a combustion temperature signal estimated from gas turbine exhaust gas temperature and compressor output pressure in a function generator FG2 to correct a combustion temperature change in actual operation are applied to a subtractor AD3 and then a correction recirculation rate signal is output from the function generator FG1. This signal is input to the function generator FG3 in which a spray amount increases as a recirculation amount increases. An output signal S2 of water droplet spray amount relative to the recirculation amount is obtained. This signal S2 and a next gas temperature of the compressor actually measured are applied to a subtractor AD14 and then a correction spray amount signal of the function generator FG3 is output. This signal is supplied to an adjustor P14 to control a spray amount (supply water amount) adjusting valve 12. By this control, the spray amount can be adjusted depending on the recirculation rate.

Figure 5:
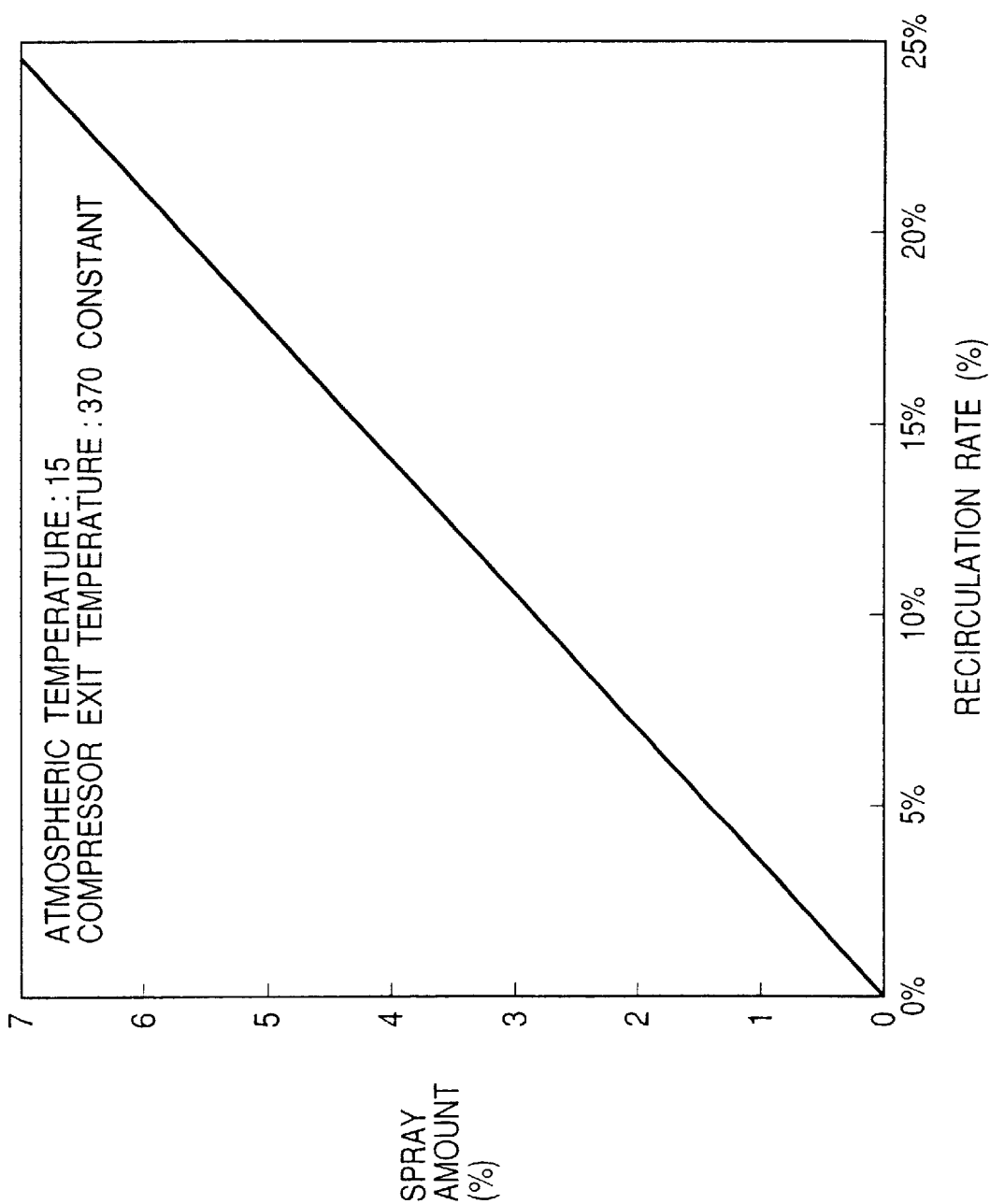
FIG. 5 is a diagram showing a relation between the recirculation rate and spray rate.

It is permissible to open the air flow adjusting valve 15 if required to produce fine droplets. FIG. 5 indicates a control line of the spray rate relative to the recirculation rate assuming that the gas turbine exhaust temperature is constant. The spray rate increases substantially linearly relative to the recirculation rate.

Although the incidence of the vane in the compressor is changed by the recirculating operation as described before, it can be returned to a state before exhaust gas recirculation by control of the aforementioned control line. For example, at the atmospheric temperature of 15° C., when the recirculation amount is 10% on exhaust gas weight flow basis, the spray amount (on outside air weight basis) is about 3% and when the recirculation amount is 20%, the spray amount is about 5.5%.

Figure 9:
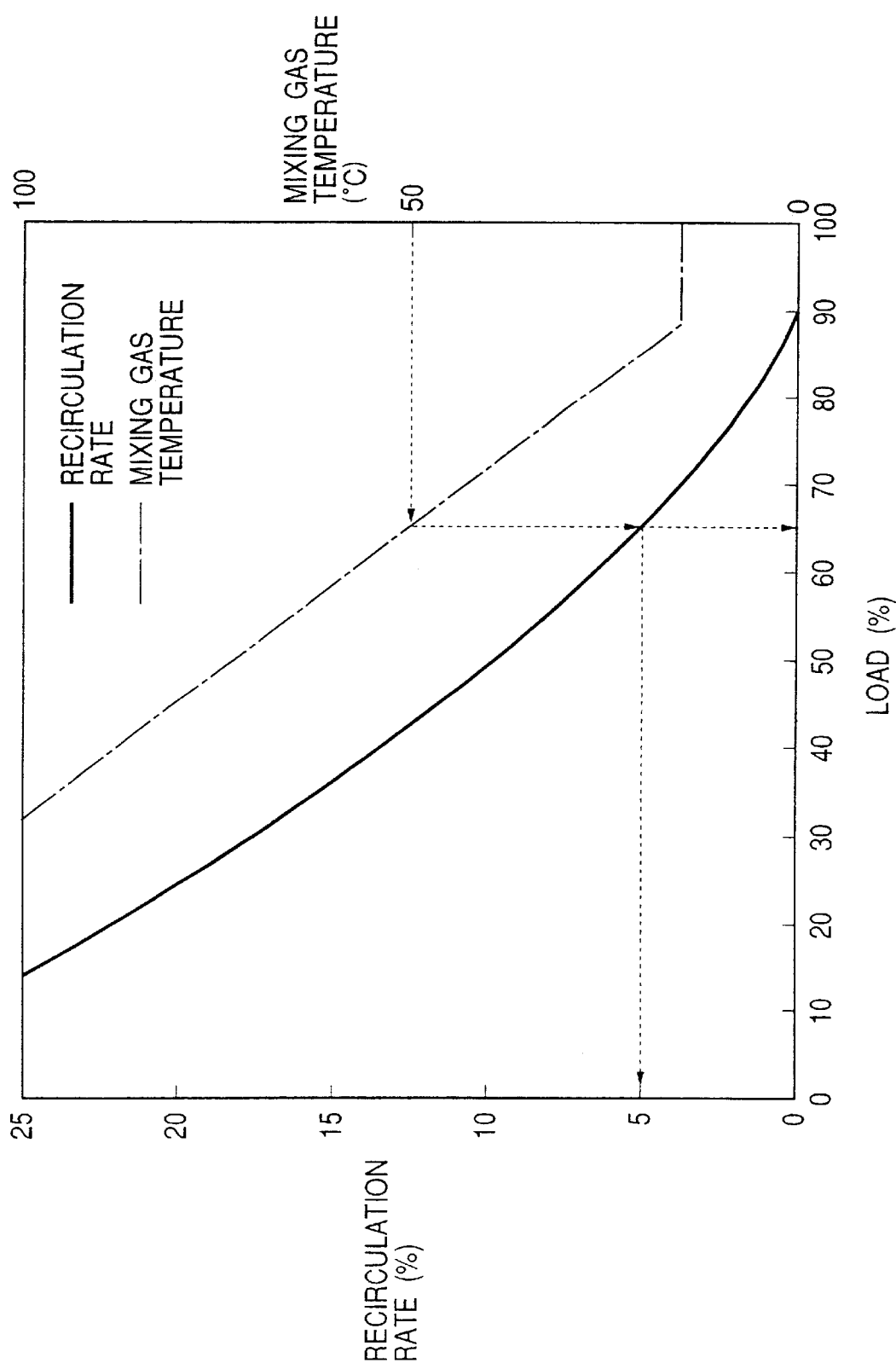
FIG. 9 is a diagram showing a relation between load, recirculation rate and mixing gas temperature.

FIG. 9 indicates a relation between mixing gas intake temperature and recirculation rate relative to each load. The mixing gas (volumetric flow rate) sucked into the compressor 1 is constant regardless of the load because the gas turbine 3 is rotating at a constant speed. As the load drops, the gas turbine exhaust gas recirculation amount increases, so that correspondingly the compressor intake air temperature rises. On the contrary, if the recirculation amount increases so that the mixing gas intake temperature rises, the gas turbine output drops owing to the decrease of the compressor intake suction weight flow rate. In a plain recirculation gas turbine of the conventional art, if stalling or the like on the vane of the last stage is considered, the upper limit of the compressor intake air is 50° C. and therefore the recirculation amount is restricted so that the gas turbine output reduction is also restricted. However, according to the present embodiment, spraying fine liquid droplets at the compressor intake so as to cool the compressor internal gas, liquid behavior in the vicinity of the compressor vane is improved. Thus, the gas turbine exhaust gas recirculation amount can be increased so that operation at a lower load is enabled and further a higher efficiency partial load operation is enabled. Although the temperature of the compression air coming out of the compressor 1 is lowered due to the vaporization of water droplets in the compressor, the combustion temperature can be maintained at a constant level by increasing a fuel loading amount. Next, the combustion gas works in a process of its adiabatic expansion in the gas turbine 3. Because a part of the combustion gas is consumed for driving the compressor 1 and generator 6, net output thereof corresponds to that difference.

The part of the gas turbine exhaust gas from the gas turbine 3 recirculates through the recirculating means 9 and control means (exhaust gas recirculation amount adjusting valve) 10 as a part of the intake air in the compressor 1. In the gas turbine exhaust heat recovery boiler 4, high pressure steam is generated and this steam drives the steam turbine 5 and generator 6 to generate power.

Figure 10:
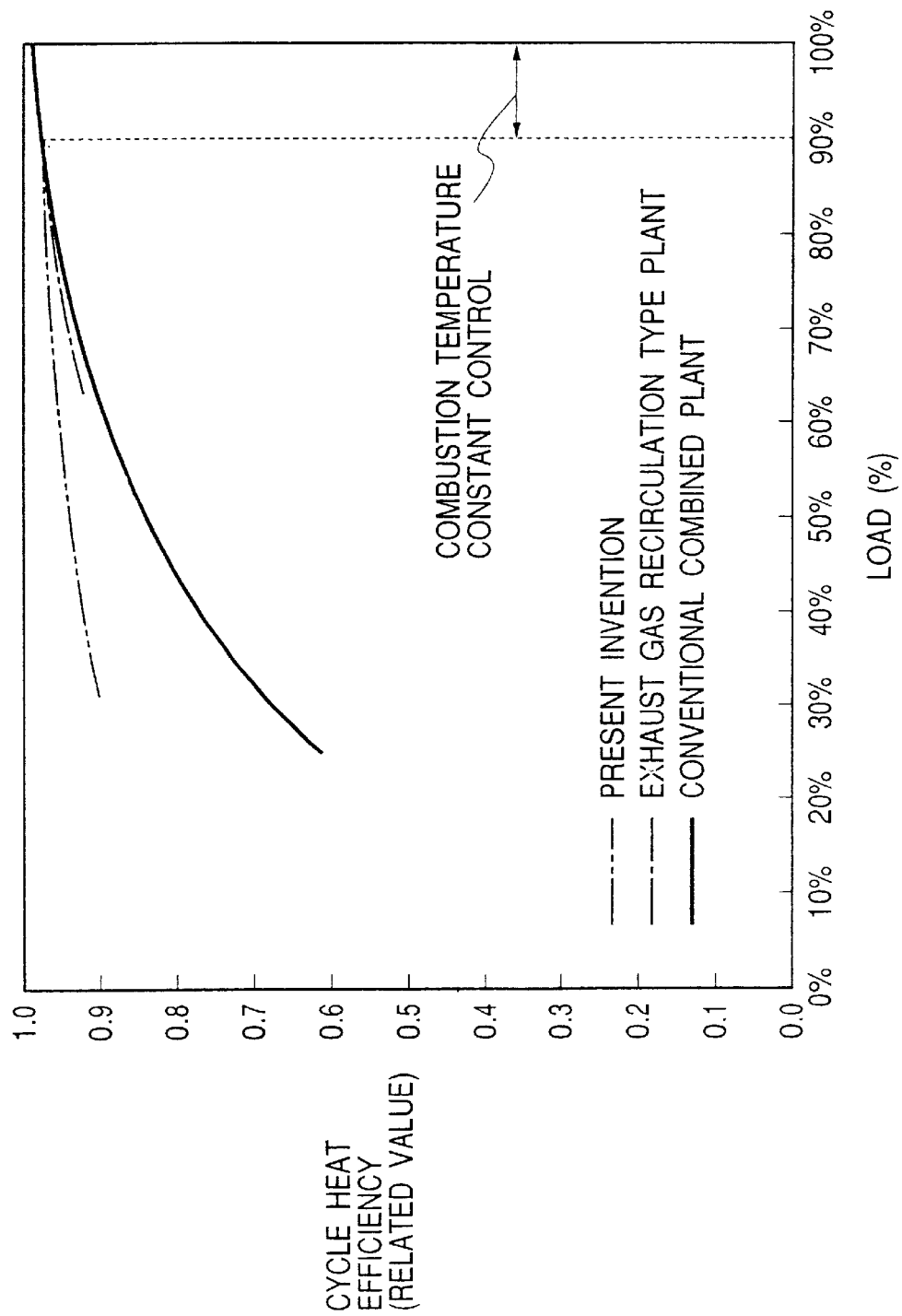
FIG. 10 is a diagram showing heat efficiency relative to load.

FIG. 10 shows a comparison of efficiency drop due to respective loads in the combined cycle with efficiency drop in ordinary combined cycle, exhaust gas recirculation type combined cycle and the present embodiment. Although as regards the cycle heat efficiency of the ordinary combined cycle, efficiency drop in a range up to 90% load in which combustion temperature constant operation is carried out is not so large, the combustion temperature drops at an operation having a less than 90% load. Therefore the efficiency drops rapidly, so that at the 25% load which is a load determined by a restriction on the bottoming side, the efficiency drops in terms of a relative value by about 40%. The combustion temperature constant operation by the aforementioned IGV or the like has a range slightly different depending on machine. However, in most cases, the efficiency drop is up to 80% even if it is small. Although in the gas turbine exhaust gas recirculation type combined cycle, its cycle heat efficiency drop is smaller than ordinary combined cycle, it cannot be operated at more than 65% load due to restriction of the compressor intake air temperature. On the contrary, according to the present invention, by cooling the internal gas in the compressor, the compressor driving power drops and its output increases, so that the heat efficiency is improved. As a result, the efficiency drop relative to each load is further reduced. Therefore, as compared to the gas turbine exhaust gas recirculation type combined cycle, a lower load operation is enabled and theoretically, the operation is enabled up to about 30% load in which oxygen concentration in the gas turbine exhaust gas is zero, The efficiency drop is about 10%.

A lower limit is preferred to be determined depending on setting of the apparatus, and generally, it is considered that in most cases, the recirculation is carried out up to at least 50% load.

Although FIG. 10 considers operation by control by IGV or the like in a range in which combined cycle load is 100–90% or 80%, the present invention is not restricted to this example, it is permissible to control the recirculation amount correspondingly if the load descends from 100%.

To increase the recirculation amount as the load decreases. assuming that the combustion temperature is 1430° C. and the compressor exit temperature is 370° C. in order to prevent the compressor exit temperature from exceeding 370° C., the compressor intake temperature is 150° C. when the combined cycle load is 74%, 112° C. when 50% and 240° C. when 30%. According to the present embodiment, by reducing the compressor exit temperature by introducing liquid droplets to be vaporized in the compressor, inconveniences which may occur at the rear end of the compressor can be avoided. Thus, by raising the recirculation rate by controlling the spray amount of the liquid droplets to be vaporized in the compressor, it is possible to control so that the temperature of the mixing gas at the compressor intake rises. Further, the recirculation amount can be increased as compared to a plain recirculation plant, so that the recirculation amount can be increased even in low partial load operation range.

Further according to the present embodiment, in a combined plant load range of at least 50–80%, it is possible to control so that the aforementioned spray amount is increased as the recirculation amount is increased and that the recirculation amount is continuously increased as the load is decreased.

Further, by controlling the aforementioned recirculation amount corresponding to the load so as to suppress a deflection of the combustion temperature in the combustion chamber in a combined plant load range of at least 50%–80% (for example, controlling so that the recirculation amount is increased as the load is decreased) and introducing the liquid droplets into the compressor, it is possible to suppress a temperature rise of the compression air at the compressor exit.

Following control can be carried out in the integrated control device 8.

The aforementioned recirculation amount and aforementioned liquid droplet spray amount are controlled corresponding to the load so as to suppress a deflection of the combustion temperature of the combustion chamber in a combined plant load range of 50%–80%.

As the load decreases, the recirculation amount is increased and the spray amount is also increased so as to suppress a drop of the combustion temperature and keep it high. As a result, a high efficiency operation is enabled in a wide range of the partial load.

Further, to suppress a deflection of the combustion temperature of the combustion chamber in a combined cycle load range of 50%–80%, the aforementioned recirculation amount is controlled corresponding to the load and by introducing the liquid droplets into the compressor, a rise of the temperature of the compression air at the compressor exit is suppressed. Because the compressor exit temperature rises as the recirculation amount is increased, the liquid droplets are introduced into the compressor and vaporized therein so that that temperature is maintained in an allowable range.

Further, the gas turbine exhaust gas amount to be returned to the compressor intake is adjusted corresponding to a change of the load in the aforementioned combined cycle and the aforementioned recirculation amount is controlled corresponding to the load to suppress a deflection of the combustion temperature of the combustion chamber in a combined plant load range of 50%–80% thereby controlling the aforementioned spray amount to be vaporized during a flow in the compressor. In this process, the recirculation amount is so controlled as to be continuously increased as the load lowers. Although if the recirculation amount is so controlled as to be increased as the load lowers, there is produced an upper limit in the increase amount of the recirculation amount for the reason of the compressor or the like, the introduction amount of the liquid droplets to be vaporized in the compressor is adjusted such that the introduction amount of the liquid droplets is increased as the load lowers. As a result, as the load lowers in a wide range of the partial load, the recirculation amount can be continuously increased.

Because the aforementioned upper limit is a upper limit load for carrying out the recirculation, if the recirculation is carried out when the load drops from 100%, the aforementioned upper limit range is expanded. Further, because the lower limit is determined depending on setting of the apparatus, it is possible to so control as to increase the recirculation amount in a wider range.

Figure 7:
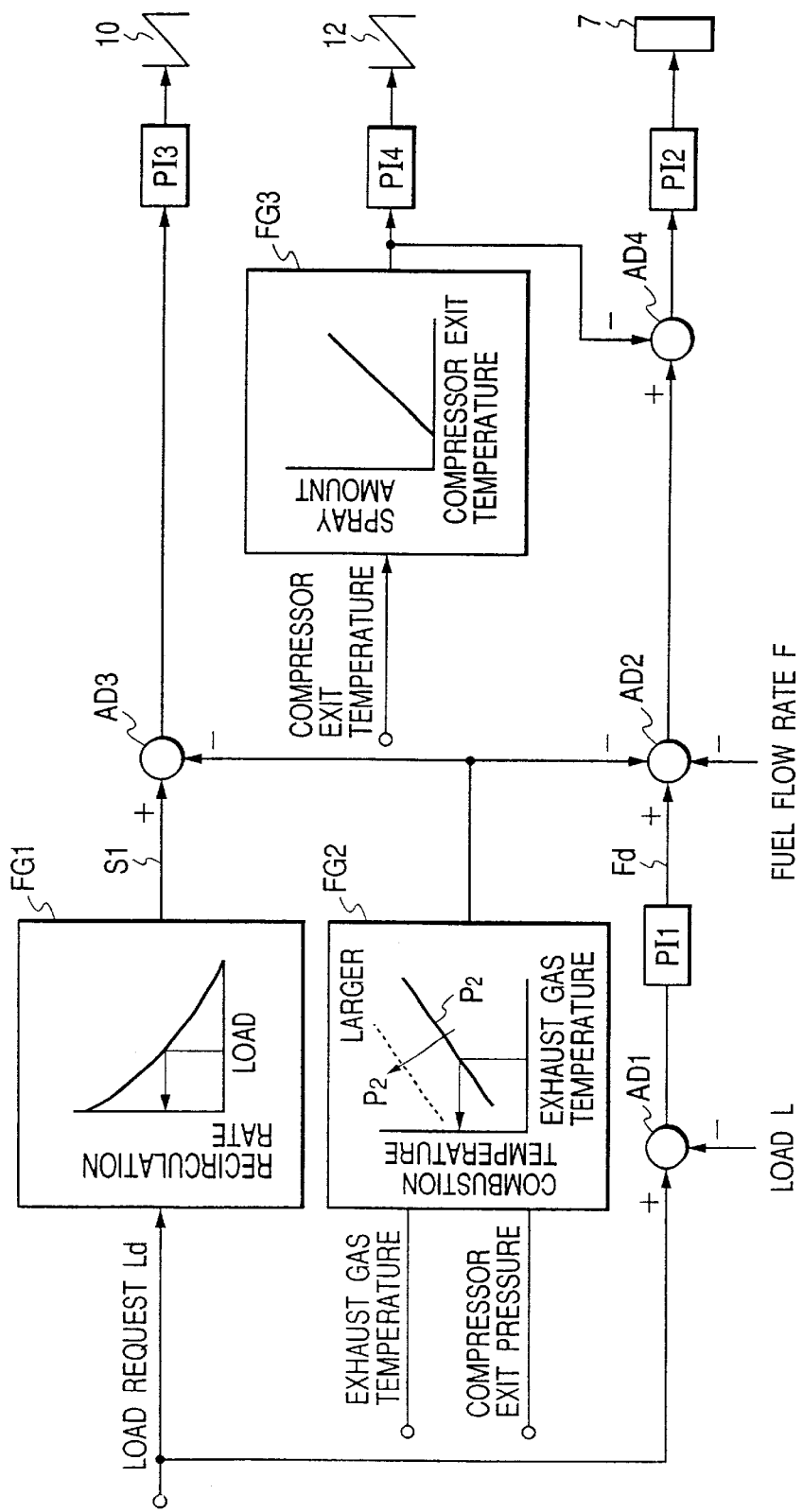
FIG. 7 is a schematic diagram for explaining a control of the integrated control unit.
Figure 8:
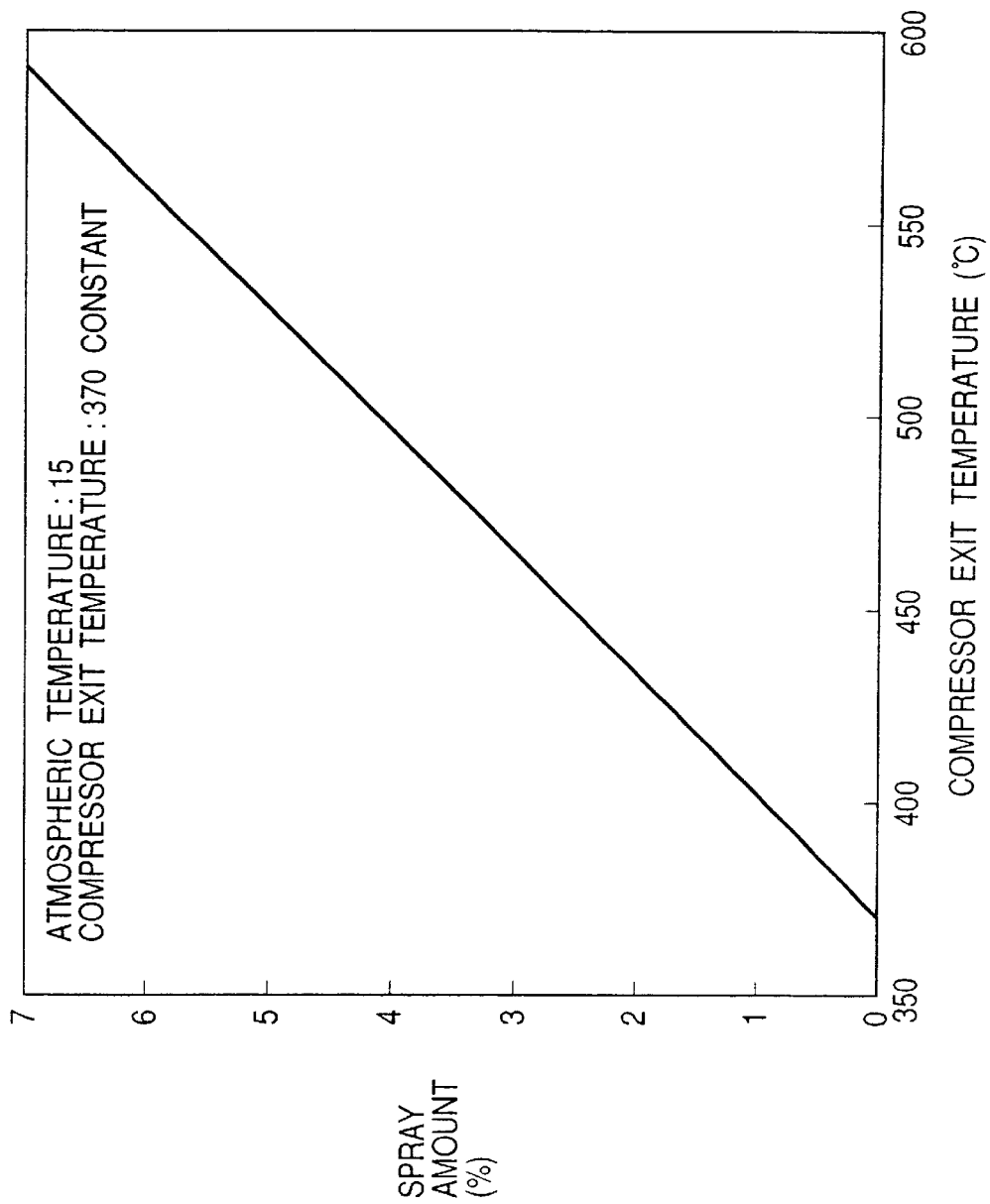
FIG. 8 is a diagram showing a relation between compressor exit temperature and spray rate.

A second embodiment will be described with reference to FIG. 1 and other diagrams. Its basic structure is the same as the first embodiment. Although the spray amount is controlled depending on the gas turbine exhaust gas recirculation amount in the first embodiment, according to the present embodiment, the spray amount control method differs in that the spray amount is controlled depending on a gas temperature measured at the compressor exit although the gas turbine exhaust gas recirculation amount control is the same as the first embodiment. Although the combined plant apparatus structure is the same as the first embodiment, a means for measuring a compressor exit gas temperature and inputting this signal into the integrated control device 8 has been added as a spray amount controlling means. FIG. 7 shows an integrated control device 8 of the present embodiment. According to the present embodiment, as shown in FIG. 7, a measured compressor exit gas temperature is input to the function generator FG3 and then a spray amount is calculated so as to suppress a deflection of the compressor exit gas temperature before the gas turbine exhaust gas is recirculated or preferably so that the temperature is constant. It is so controlled so that the spray amount is increased as the exit temperature rises. By means of the adjuster PI4 based on the obtained spray amount signal, the spray amount (supply water amount) adjusting valve 12 is controlled. On the other hand, because the combustion temperature may be changed by spraying, the fuel flow rate of a case in which the liquid droplets are sprayed is correctively controlled by applying a spray amount signal to a fuel flow rate signal obtained from the load request signal Ld and actual load L, thereby achieving a constant combustion temperature. As an example, FIG. 8 shows a control line for calculating a compressor exit gas temperature before the gas turbine exhaust gas recirculation from a compressor exit gas temperature when the atmospheric temperature is 15° C. Although the compressor exit gas temperature is about 450° C. when the gas turbine exhaust gas recirculation amount is 10%, by carrying out about 2.5% spray at the compressor intake, the compressor exit gas temperature constant operation before carrying out the gas turbine exhaust gas recirculation is made possible. Further because the compressor exit gas temperature is changed depending on a change of the atmospheric temperature even if the gas turbine exhaust gas recirculation amount is constant, it is desirable that the control line contains the atmospheric temperature as a parameter. Thus, an operation not following a minute change of the output or change in the temperature is enabled, so that the operation control is facilitated.

Because a temperature of the rear end of the compressor which is a cause for inconvenience of compression is directly reflected, a higher precision operation is enabled.

A third embodiment will be described with reference to FIG. 1 and other diagrams. Its basic structure is the same as the structure of the first embodiment.

A feature of the present embodiment exists in that a detection unit for detecting a mixing gas temperature at the compressor intake is provided and the spray amount is controlled depending on a temperature provided by that temperature detection unit.

For example, it is so controlled that when the temperature of the mixing gas entering the compressor is high rather than low, more liquid droplets are sprayed by the integrated control device 8. Further, the spray amount is controlled so as to obtain the compressor exit temperature before exhaust gas recirculation.

As a result, even at a low partial load operation time, high efficiency operation is enabled.

A fourth embodiment will be described with reference to FIG. 1 and other diagrams. Its basic structure is the same as that of the first embodiment.

A feature of the present embodiment exists in that the spray amount is controlled by the integrated control device 8 according to a signal from a combined cycle plant load measuring apparatus.

For example, it is so controlled that more liquid droplets are sprayed when the load is low rather than high As a result, at a low partial load operation time, a high efficiency operation is enabled.

The load is often measured on regular operation as well and can be controlled easily because such a signal is available.

A fifth embodiment will be described with reference to FIG. 1 and other diagrams.

Its basic structure is the same that of the first embodiment. A point of the present embodiment is a gas turbine apparatus not provided with a exhaust heat recovery boiler 4 supplied with exhaust gas from the gas turbine 3 and a steam turbine supplied with steam generated in the gas turbine exhaust heat recovery boiler 4.

As described in the aforementioned first embodiments, there is provided a spray unit for introducing liquid droplets in the compressor in which the mixing gas comprising gas turbine exhaust gas passing through the aforementioned recirculation path and air flows so as to vaporize the introduced liquid droplets during a flow in the compressor. As a result, the amount of the gas turbine exhaust gas to be returned to the compressor is adjusted corresponding to the load change of the aforementioned combined cycle plant. The liquid droplets are sprayed from the spray unit into the compressor in which the mixing gas comprising gas turbine exhaust gas passing through the aforementioned recirculation path and air flows so as to vaporize the introduced liquid droplets during a flow in the compressor.

Additionally, a spray amount control unit for controlling a spray amount corresponding to the aforementioned recirculation amount is also provided. Corresponding to the load on the combined cycle plant, it is so controlled as to spray more when the load is low rather than high.

Further, the spray amount is controlled corresponding to a change of the temperature of the mixing gas to be introduced to a compressor intake. The spray amount is so controlled as to be more when the mixing gas temperature is high rather than low.

As a result, as described above, the temperature of the internal gas in the compressor can be reduced so that the characteristic of the compressor can be improved. Thus, the gas turbine exhaust gas recirculation amount can be increased so that the partial load operation range can be expanded. Further, by an effect of water droplet spray into compressor intake air, the heat efficiency can be improved higher than the gas turbine exhaust gas recirculation type gas turbine apparatus.

A sixth embodiment of the present invention will be described with reference to FIGS. 11–16. In the sixth embodiment, the spray amount and recirculation amount are controlled depending on a temperature of exhaust gas to be introduced to the compressor.

Figure 11:
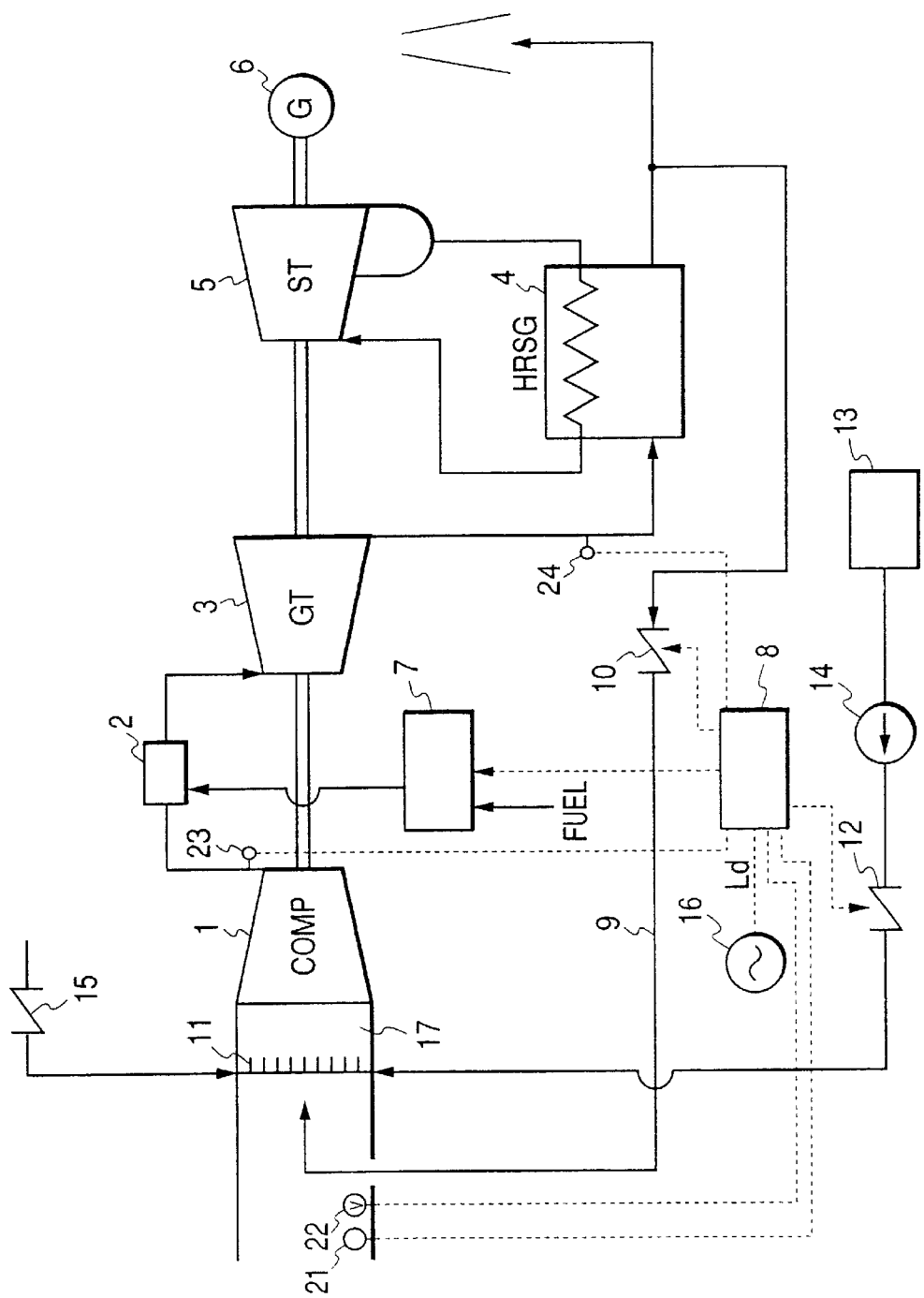
FIG. 11 is a schematic diagram of an embodiment of the present invention.

FIG. 11 shows a schematic view of this embodiment. Basically, this is of the same structure as the schematic view of the first embodiment. In this embodiment, recirculating exhaust gas is introduced from a downstream side of the gas turbine exhaust heat recovery boiler 4.

Although the pipe 9 for fetching out a part of exhaust gas of the gas turbine 3 may be provided at any place of the gas turbine exhaust heat recovery boiler, exhaust heat recovery boiler intake portion and outlet portion, it should be provided at the gas turbine exhaust heat recovery boiler outlet portion like this embodiment so as to make effective use of heat in the gas turbine exhaust gas. The operation ends include a fuel amount control valve 7 for controlling the fuel amount to be charged on the combustion chamber 2, a recirculation amount control means 10, a spray amount adjusting valve 12 and air flow amount adjusting valve 15 and these operation ends are controlled depending on an operation signal dispatched from an integrated control unit 8. Such an operation enables to control the power generation efficiency of the combined plant. A signal of a temperature detection unit 21 for detecting the temperature of air to be supplied to the compressor is transmitted to the integrated control unit. Preferably, a signal of the humidity detection unit 22 is transmitted. The temperature detection unit 21 and humidity detection unit 22 can be provided at a converging portion of the recirculation exhaust gas or in the upstream of the spray nozzle 11. The entire plant is controlled by an instruction from the integrated control unit a so as to control the recirculation amount, fuel amount, air amount and water spray amount appropriately. For example, a compressor intake temperature is inputted to raise plant efficiency so that the plant load is controlled so as to be constant.

Figure 12:
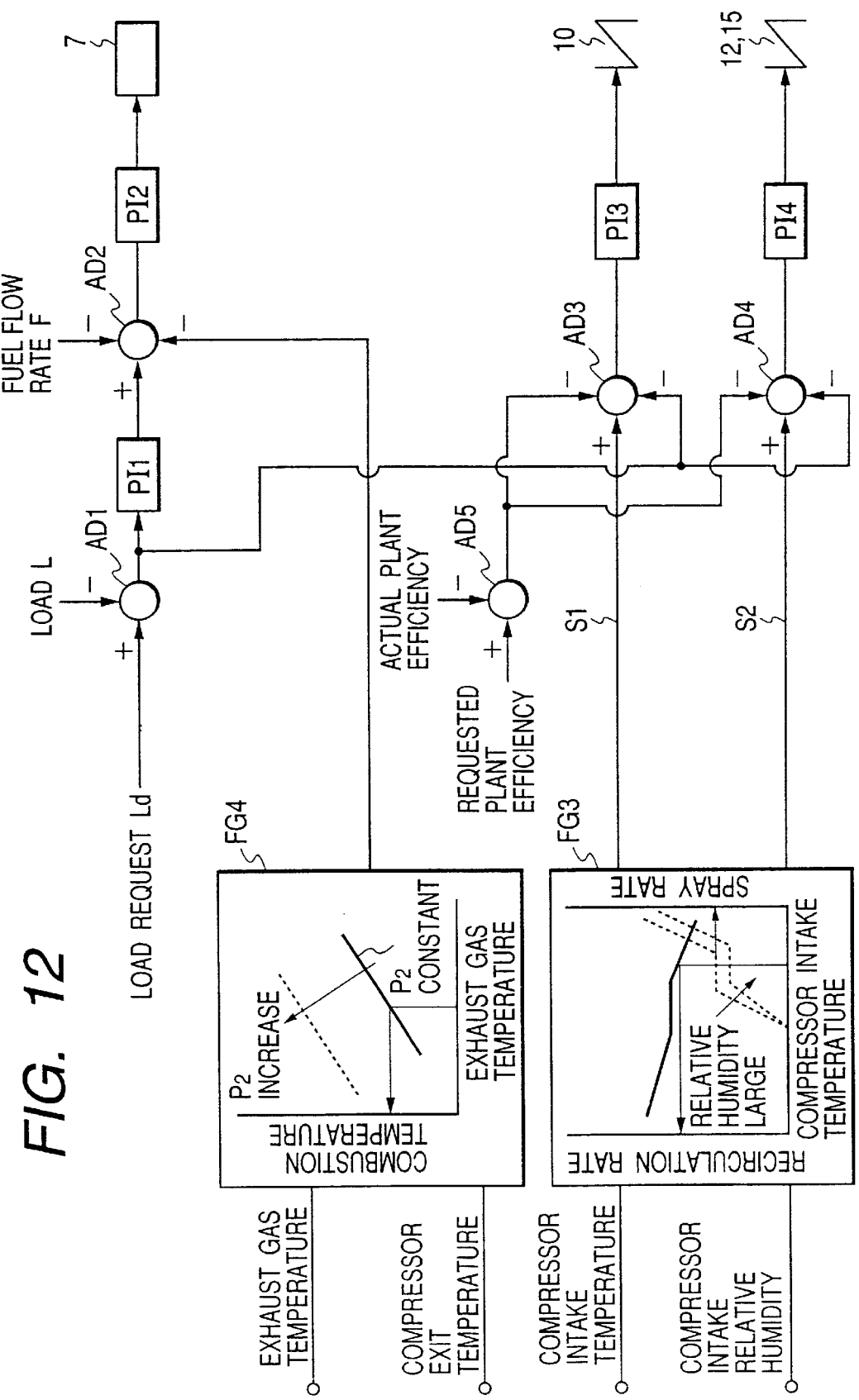
FIG. 12 is a schematic diagram of control of an integrated control unit.

FIG. 12 shows an example of the control mechanism of the integrated control unit. First, a difference between a load request signal Ld and actual load L is obtained by a subtractor AD1 and then a fuel amount object signal Fd is obtained by an adjuster PI1. Next, a difference between the fuel amount object signal Fd and actual fuel amount F is obtained by the subtractor AD2 and a fuel amount control valve 7 is adjusted by an adjuster PI2 so as to determine an amount of fuel to be charged on the combustion chamber. The fuel amount can be controlled in this manner. For example, this control is capable of increasing the amount of fuel to be charged on the combustion chamber 2 as the load increases. According to a compressor intake temperature, preferably additionally a compressor intake humidity, an instruction signal S1 on the recirculation amount is dispatched by a function generator 3 (FIG. 3). This signal is supplied to an adjuster PI3 so as to control the recirculation control means 10. Further the function generator 3 (FIG. 3) generates an instruction signal S2 on the spray amount from a spray nozzle 11. This signal is supplied to an adjuster PI4 and controls a supply water amount adjusting valve 12 and an air flow adjusting valve 15 so as to control a spray amount of droplet from the spray nozzle 11. It is favorable to estimate a combustion temperature from the gas turbine exhaust gas temperature and compressor outlet pressure by means of a function generator 4 (FIG. 4) and apply this value to the subtractor AD2 to carry out corrective control of the fuel amount. When a change occurs in the compressor intake temperature or external air temperature, the fuel is adjusted corresponding to that change thereby suppressing a change in combustion temperature so as to make the combustion temperature constant. Although keeping the combustion temperature constant is important to realize a high efficient plant operation, there is a possibility that the combustion temperature may change in actual operation. Therefore, if the change in the combustion temperature is controlled based on an actual combustion temperature estimated from the actual exhaust gas temperature of a gas turbine and compressor discharge pressure, it is possible to carry out the operation while suppressing a drop of the combustion temperature at the time of water spray or recirculation. This prevents a drop of efficiency due to a decrease of the fuel temperature.

Further, it is desirable to obtain a difference between the load request signal Ld and actual load L by the subtractor AD1 and correct an output of the function generator 3. This contributes to making the load constant.

It is desirable to realize an optimum plant efficient operation based on the output of the function generator 3.

Because the plant efficiency may change in actual operation, it is desirable to calculate a difference between a requested plant efficiency ηd and actual plant efficiency η by means of the subtractor AD5 and apply an output of the subtractor AD5 to the subtractors AD3, AD4 so as to correct an output of the function generator 1. As a result, a high efficiency operation can be achieved even in actual operation.

The function generator 3 calculates a combustion temperature according to a signal from the gas turbine exhaust gas temperature detector 24 and a signal from a compressor discharged air temperature detector 23 and dispatches a signal to the AD2. For example, it is possible to calculate so that the combustion temperature is higher when the gas turbine exhaust gas temperature is high than when it is low or the same when the compressor discharge pressure is high than when it is low.

A numeral value corresponding to the combustion temperature can be outputted by other means. The function generator 4 controls a spray amount of a spray nozzle 11 based on a compressor intake temperature. Further, it controls the recirculation amount. The spray amount and the like is preferred to be corrected based on the compressor intake humidity. The spray amount (or a limit value of the spray amount) increases as the temperature rises, so that the spray amount (or a limit value of the spray amount) can be adjusted so as to be larger when the humidity is low than when it is high. When a detected temperature of air supplied to the compressor is in a set first temperature region, the recirculation is carried out and the spray of droplets from the spray unit is stopped. If the detected temperature is in a second temperature region which is higher than the first temperature region, the recirculation is stopped and the spray of the droplets from the spray unit is stopped, If the detected temperature is in a third temperature region which is higher than the second temperature region, the recirculation is stopped and the spray unit is controlled to spray the droplets. It is desirable to set a upper limit and lower limit of a region in which a high combined plant efficiency is ensured, so that they are set to a change temperature between the first temperature region and second temperature region and a change temperature between the second temperature region and third temperature region. It is desirable to set the aforementioned respective temperatures from a range between 15° C. and 22° C. which ensures a high combined plant efficiency. If some plant deviates from this region, it is desirable to set these values depending on the plant.

By monitoring the compressor intake temperature, the recirculation amount and water spray amount are controlled so as to reach such a compressor intake temperature allowing the plant efficiency to be maximized and realize a constant load on the plant at all times. In the case of the first temperature region, for example, if the compressor intake temperature is lower than an intake air temperature region allowing the plant efficiency to be high, the function generator FG3 to which the compressor intake temperature is to be inputted is requested to dispatch a signal Si which increases the recirculation rate as the intake temperature decreases. This signal S1 is supplied to the adjuster PI3 so as to control the recirculation control means 10. The signal S1 controls the recirculation amount to a desired output and can be used as a limit value of the recirculation amount.

In the case of the second temperature region, the recirculation and the spray of droplets from the spray nozzle 11 are stopped. In the case of the third temperature region, for example if the compressor intake temperature is higher than the intake air temperature which allows the plant efficiency to be high, the function generator FG1 to which the compressor intake temperature and humidity are to be inputted is requested to dispatch a signal S2 which increases the spray rate as the intake air temperature rises or the relative humidity lowers. This signal S2 is supplied to the adjuster PI4 so as to control the water supply amount adjusting valve 12 and air flow amount adjusting valve 15.

As a result, even if the external air temperature changes, the compressor intake temperature can be kept constant by the recirculation amount control and spray amount control or the change can be suppressed excellently. Thus, even if the atmospheric temperature changes, the combined plant can be operated at a high plant efficiency.

Because the first temperature region and third temperature region are provided through the second temperature region, if the atmospheric temperature changes, the control in the second temperature region in which the combined plant efficiency is high can be facilitated. Despite a change in the atmospheric temperature, a desired output can be obtained at a high efficiency.

Consequently, a high reliability plant unlikely to be affected by a temperature change can be constructed.

As the case may be, it is possible to narrow the aforementioned second temperature region and set it to a certain temperature. Such a case is favorable for realizing a high efficiency operation.

Because the gas turbine exhaust gas recirculation and water droplet spray are switched over across an atmospheric temperature producing a high plant efficiency, the plant control is facilitated.

The high efficiency operation will be described. The plant efficiency is determined by the plant output (gas turbine output and steam turbine output) and fuel flow rate.

Figure 14:
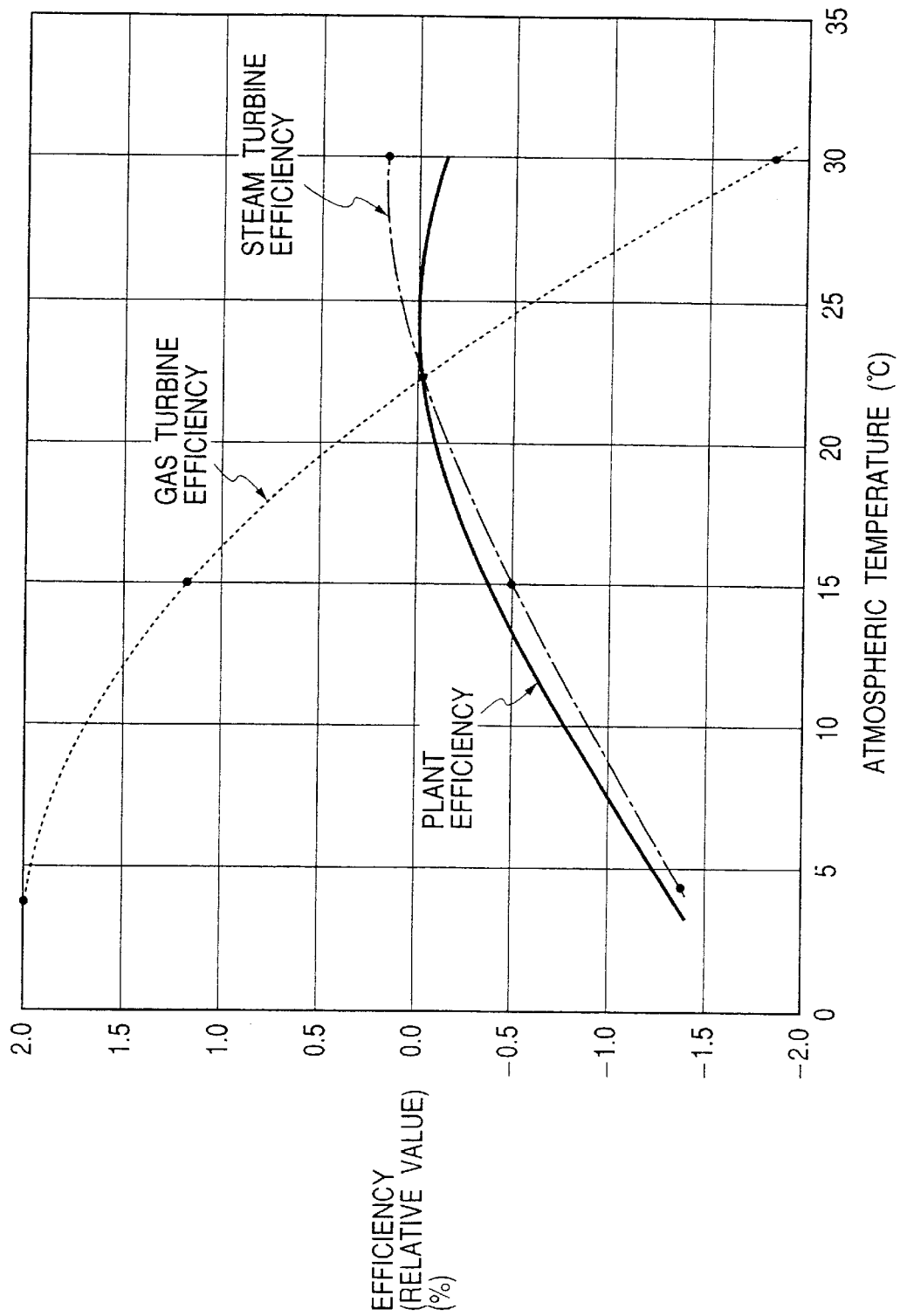
FIG. 14 is a schematic diagram showing an efficiency characteristic depending on the atmospheric temperature.

FIG. 14 shows an efficiency characteristic depending on the atmospheric temperature. If the atmospheric temperature drops below an atmospheric temperature allowing the plant efficiency to be maximized, the compressor intake weight flow rate increases. On the other hand, because the combustion temperature is constant, the fuel flow rate increases so that the gas turbine output also increases.

Although the steam cycle is influenced by an increase of the gas turbine exhaust gas flow rate accompanied by an increase of the compressor intake weight flow rate and a drop of the gas turbine exhaust gas temperature due to a drop of the atmospheric temperature, the steam turbine output is increased because the influence by the gas turbine exhaust gas flow rate is large.

However because the increase rate of the steam turbine output is smaller than that of the gas turbine output, the increase rate of the plant output is small so that the plant efficiency is also small.

On the other hand, if the atmospheric temperature rises over an atmospheric temperature under which the plant efficiency is maximized, the fuel flow rate decreases with a decrease of the compressor intake weight flow rate, so that the gas turbine output and steam turbine output drop. Particularly because the gas turbine output drop is large, the plant efficiency is reduced.

Figure 15:
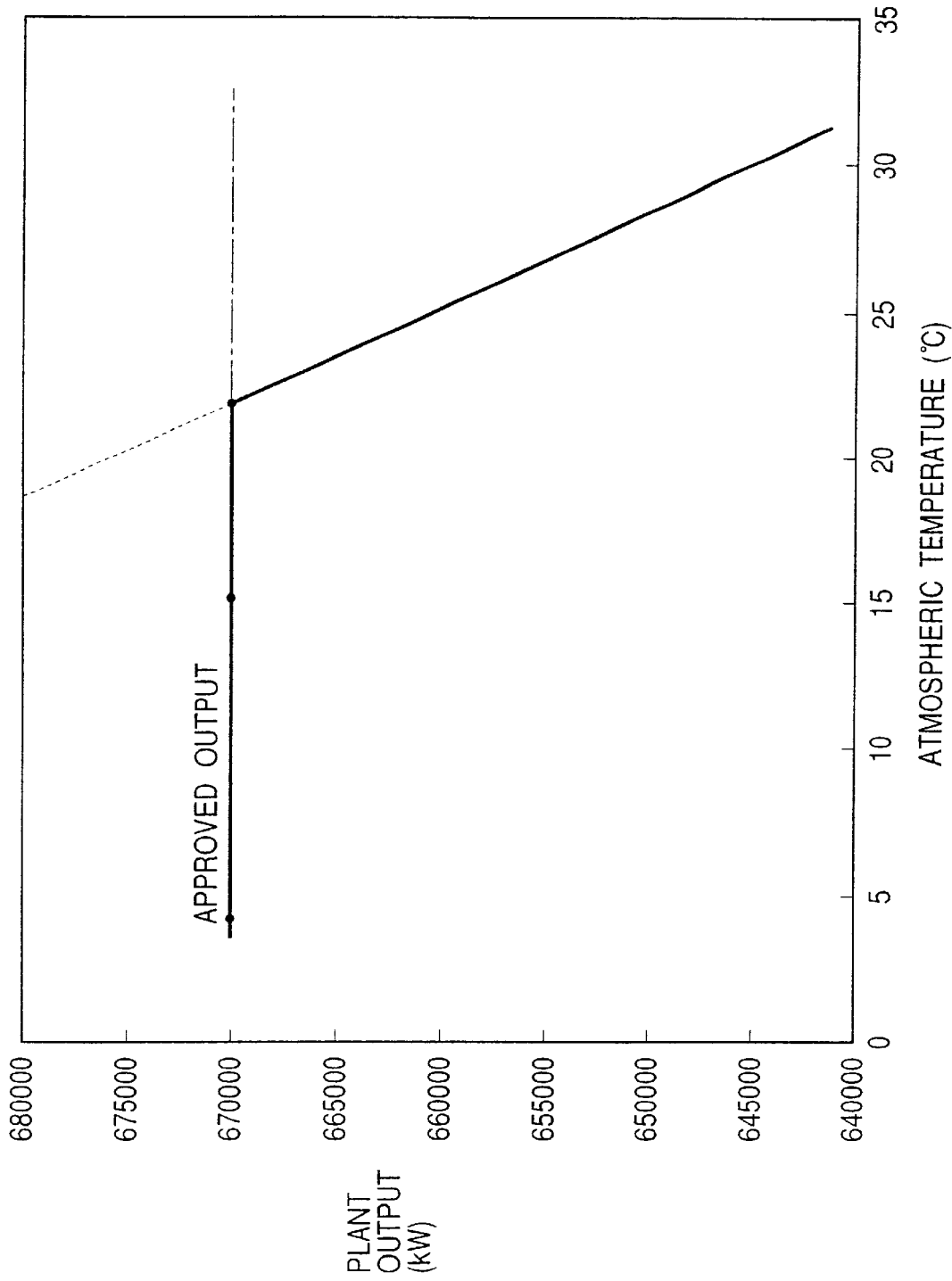
FIG. 15 is a schematic diagram showing the atmospheric temperature and plant output.

FIG. 15 shows a relation between the atmospheric temperature and plant output, The plant output changes depending on the atmospheric temperature and as the atmospheric temperature lowers, the plant output increases as shown by broken line. However, in actual power generation plants, each approved output is specified and therefore it is considered that an operation exceeding that limit is not carried out. Therefore, if the approved output is reached, the approved output constant operation is continued irrespective of the atmospheric temperature as shown by a solid line and at this time, the gas turbine is operated with a partial load. If the atmospheric temperature rises, the gas turbine compressor intake weight flow rate and fuel flow rate are reduced so that the plant output drops.

Figure 16:
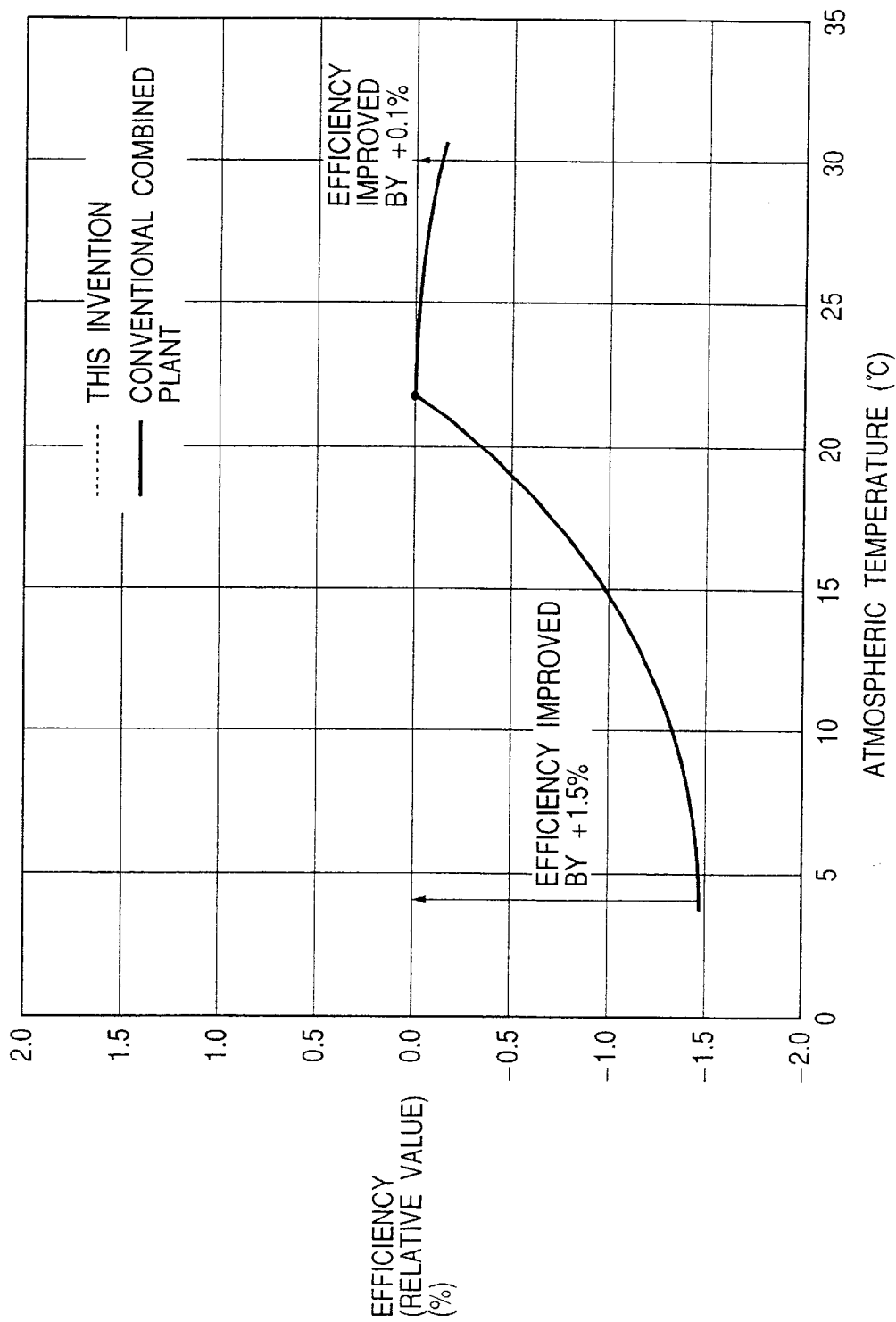
FIG. 16 is a schematic diagram showing plant efficiency depending on the atmospheric temperature.

FIG. 16 shows a plant efficiency characteristic depending on the atmospheric temperature. In the aforementioned combined plant, if the approved output constant operation is carried out, the gas turbine is operated with its partial load, and therefore the plant efficiency is reduced extremely. However, by this embodiment, the gas turbine intake temperature can be the same as the atmospheric temperature allowing a high plant efficiency.

For example, with the recirculation rate of 0–40% with respect to the gas turbine exhaust gas flow rate, the plant efficiency can be improved by about 0–1.5% in terms of its relative value. If the compressor intake temperature is higher than the atmospheric temperature in which the plant efficiency is high, the plant efficiency can be improved by about 0.1% in terms of the relative value by a spray amount 0–0.2% the gas turbine intake flow rate by spraying droplets from the water spray nozzle 11 to gas turbine intake air. Therefore, if the atmospheric temperature is low, by returning a part of the gas turbine exhaust gas to the compressor intake by the gas turbine exhaust gas recirculation system, the compressor intake weight flow rate can be reduced so as to reduce the plant output. Therefore, the gas turbine can be operated at the approved output constant rating without being operated with its partial load. Further, if the atmospheric temperature is high, the plant output can he increased by increasing the compressor intake weight flow rate by the intake air water spray system, so that the constant loaded operation can be achieved at a high efficiency without depending on the atmospheric temperature. The seventh embodiment will be described with reference to FIGS. 11–16.

Basically, the seventh embodiment is capable of having the same structure as the sixth embodiment except that: If the detected temperature of air supplied to the compressor is in the first temperature region under control of the sixth embodiment, the aforementioned recirculation is carried out and the spray of droplets from the spray unit is stopped. If the detected temperature is in the second temperature region which is higher than the first temperature region, the aforementioned recirculation is carried out and the spray unit is controlled to spray droplets. If the detected temperature is in the third temperature region which is higher than the second temperature region, the aforementioned recirculation is stopped and the spray unit is controlled to spray droplets.

Figure 13:
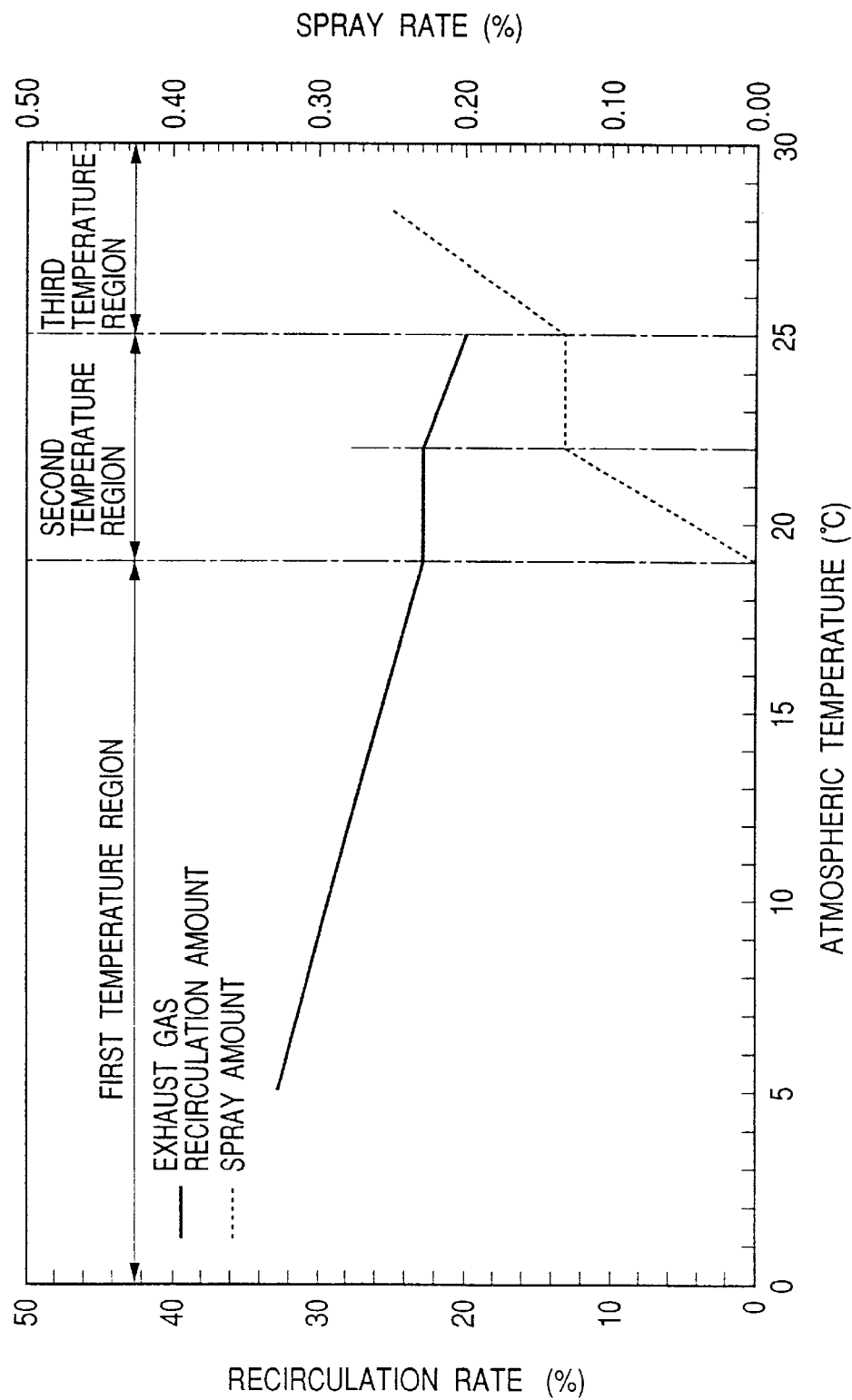
FIG. 13 is a schematic diagram of a control line.

The change temperature between the first temperature region and second temperature region, and the change temperature between the second temperature region and third temperature region can be set in the same way as in the sixth embodiment. FIG. 13 shows an example of the control line.

First, in the first temperature region (for example, in a case when the compressor intake temperature is lower than such a compressor intake temperature in which the plant efficiency is maximized), it is so controlled that the recirculation amount increases as the compressor intake temperature lowers.

In the second temperature region (for example, in such a temperature region in which the compressor intake temperature includes a compressor intake temperature allowing the plant efficiency to be maximized), the gas turbine exhaust gas is recirculated and the aforementioned droplet spray from the water spray nozzle 11 is carried out. In this embodiment, FIG. 13 shows a case in which the second temperature region is more than 19° C. and less than 25° C. Preferably, the second temperature region is divided to a high temperature side and a low temperature side relative to the set value. The set value is preferred to be determined with respect to such a value in which the combined plant efficiency is high. For example, it can be set in a range of 15° C.–22° C. Further the second temperature region can be set by providing the set value with an allowance of ±2° C.–±3° C.

The aforementioned second temperature region should be set to a region in which the plant can be operated with stability, Concretely, the compressor intake temperature allowance may be about 5° C.

In the aforementioned low temperature region, the recirculation amount is kept constant and the intake air water spray system is started. The spray amount (or a limit value of the spray amount) of droplets from the water spray nozzle is preferred to be set so as to larger when the temperature is higher. The spray amount can be controlled to such a compressor intake temperature in which a plant efficiency is increased when the load on the plant is kept constant. It is possible to so control that the recirculation amount is kept constant until the compressor intake temperature reaches a compressor intake temperature in which the plant efficiency is maximized and the spray amount increases as the compressor intake temperature rises.

In the high temperature region, it is favorable to so control that with the spray amount kept constant, the recirculation amount is decreased when the temperature of air to be supplied to the compressor is high as compared to when it is low.

In the third temperature region (for example, in a case when the compressor intake temperature is higher than a compressor intake temperature in which the plant efficiency is maximized), the recirculation of the gas turbine exhaust gas is stopped and water is sprayed from the water spray nozzle 11. For example, it can be so controlled that the spray amount increases as the compressor intake temperature rises.

As a result, even if the external air temperature changes, high efficiency constant operation can be achieved.

Because there is provided a region in which the recirculation of the gas turbine exhaust gas and spray of droplets from the water spray nozzle 11 are carried out even when the external air temperature changes, the changeover in the second temperature region can be executed smoothly.

Further, it is possible to suppress changes in the efficiency of the plant and output thereof in a temperature region in which the plant efficiency is high. That is, it is possible to suppress a deviation from a desired output by preventing the output change while achieving smooth droplet spray and recirculation.

By forming such a temperature region in which the spray of droplets and recirculation of the gas turbine exhaust gas are executed in the aforementioned second temperature region or a region in which the water spray from the water spray nozzle 11 and changeover of the recirculation of the gas turbine exhaust gas are carried out, even if the external air temperature changes suddenly, the high efficiency operation can be continued responding quickly to this. Further, this embodiment is capable of largely contributing to an operation ensuring a high efficiency and suppressing a change in load (preferably, constant load operation) even if the external air temperature changes. Particularly, it is possible to easily suppress a change in the spray amount due to a change in the external air temperature and a output change due to a change in the recirculation amount.

An eighth embodiment of the present invention will be described with reference to FIG. 17.

The eighth embodiment includes a carbon dioxide gas condensing mechanism for condensing carbon dioxide so as to reduce carbon dioxide (e.g., $CO_2$) in the gas turbine exhaust gas and a carbon dioxide gas removing unit 41*a* for reducing the concentration of carbon dioxide contained in the gas turbine exhaust gas, which contains the condensed carbon dioxide gas.

In the gas turbine exhaust gas recirculation plant, by returning the gas turbine exhaust gas to the intake of the gas turbine so as to achieve recirculation in the gas turbine cycle, the concentration of carbon dioxide gas becomes higher than the conventional plant. As the recirculation amount increases, the concentration of the carbon dioxide in the gas turbine exhaust gas becomes higher. As a result, the carbon dioxide removing efficiency also rises. When the concentration of oxygen in the gas turbine exhaust gas becomes zero, namely the gas turbine exhaust gas recirculation rate is 75%. the concentration of carbon dioxide in the gas turbine exhaust gas becomes about four times as compared to the conventional plant.

Because the performance of the carbon dioxide gas removing unit is parallel to the concentration of carbon dioxide gas, volumetric flow rate and transfer area, if the concentration of carbon dioxide becomes four times while the performance of the carbon dioxide gas removing unit is the same, the transfer area can be reduced by ¼.

For the reason, the carbon dioxide gas can be reduced by introducing the gas turbine exhaust gas containing the condensed carbon dioxide gas to the carbon dioxide gas removing unit 41*a*. Therefore, as compared to a case when the carbon dioxide gas removing unit is only installed in the gas turbine plant, the carbon dioxide can be removed at a high efficiency. Further, if the same removing performance as the carbon dioxide gas removing unit of the conventional plant is ensured, the size of the carbon dioxide gas removing unit can be reduced.

Therefore, because the size of the carbon dioxide gas removing unit to be installed on the flow path of the gas turbine exhaust gas can be reduced, the pressure loss can be suppressed thereby contributing to a high efficiency operation of the gas turbine.

Additionally, in the carbon dioxide gas condensing mechanism, the gas turbine exhaust gas is recirculated so as to run the gas turbine according to this embodiment, carbon dioxide gas of a high concentration is generated and the gas turbine exhaust gas of a high concentration is introduced to the carbon dioxide gas removing unit, As a result, the gas turbine can be operated at a higher efficiency.

Because the carbon dioxide can be removed at a high efficiency while achieving a high efficiency operation of the gas turbine, there is such a basic effect as forming a gas turbine or combined plant taking care of the environment and gentle to the environment.

The spray nozzle 11 is preferred to be run as described in the aforementioned embodiment Basically the eighth embodiment can possess a structure of the sixth embodiment. The eighth embodiment contains a carbon dioxide gas removing unit 41*a* which is provided on an exhaust gas path 31 as well as the structure of the sixth embodiment.

The gas turbine exhaust gas emitted from the gas turbine 3 is supplied to the upstream of the compressor 1 through a recirculating means 9. Mixing gas comprising air and recirculated exhaust gas is introduced to the compressor 1 so as to raise the pressure. The mixing gas discharged from the compressor 1 and fuel are introduced to the gas turbine chamber 2 and burnt together. As a result, gas turbine exhaust gas having a higher concentration of carbon dioxide than a plain gas turbine having no recirculating means is discharged from the gas turbine chamber 2 so as to drive the gas turbine 3. A part of the gas turbine exhaust gas having a high concentration of carbon dioxide is diverged to the recirculating means 9 and the remainder thereof is introduced to the carbon dioxide gas removing unit 41*a* installed on the gas turbine exhaust gas path 31 in the downstream of the diverging portion so that the concentration of the carbon dioxide is reduced. After the concentration of the carbon dioxide is reduced, the gas turbine exhaust gas is emitted to the air through a stack or the like.

As a result, in addition to the aforementioned basic effect, as compared to a case in which the carbon dioxide gas removing unit 41*a* of the present invention is installed on the gas turbine exhaust gas path 32 or recirculation means 9 between the gas turbine and the diverging portion of the recirculating means 9, the carbon dioxide concentration of the gas turbine exhaust gas to be supplied to the carbon dioxide gas removing unit 41*a* can be maintained at a high level Thus, the carbon dioxide can be removed at a high efficiency. Further, in a case when not so a high efficiency is required, the size of the carbon dioxide gas removing unit 41 can be reduced while ensuring a desired performance. Due to the reduced size, the pressure loss in the gas turbine exhaust gas path can be reduced, thereby contributing to a high efficiency operation of the gas turbine. Further, because an amount of the gas turbine exhaust gas to be diverged by the recirculating means 9 and emitted to the air is introduced to the carbon dioxide gas removing unit 9, that amount can be smaller than otherwise thereby the pressure loss being suppressed from this point of view, contributing to a high efficiency operation of the gas turbine.

Even in a case when the recirculation amount is controlled to be deflected, the control of carbon dioxide to be emitted to the air is facilitated.

To remove the carbon dioxide gas at a high efficiency while achieving a highly stabilized recirculating operation, it is preferable that the recirculation amount is lower than 75% the flow rate of the gas turbine exhaust gas.

As the carbon dioxide gas removing unit 41*a*, it is possible to use one having a carbon dioxide gas removing performance capable of reducing the concentration of carbon dioxide to be supplied to the carbon dioxide gas removing unit by 5%–10%. For example, the carbon dioxide gas removing unit may be one using amine base absorptive agent.

In a case when the gas turbine exhaust heat recovery boiler 4 is disposed in the downstream of the diverging portion of the recirculating means 9, the carbon dioxide gas removing unit is preferred to be located in the downstream of the gas turbine exhaust heat recovery boiler from viewpoints of a more compact structure, material strength and the like. This unit may be disposed within the gas turbine exhaust heat recovery boiler from viewpoints of simplification of the apparatus on the gas turbine exhaust gas path.

Figure 17:
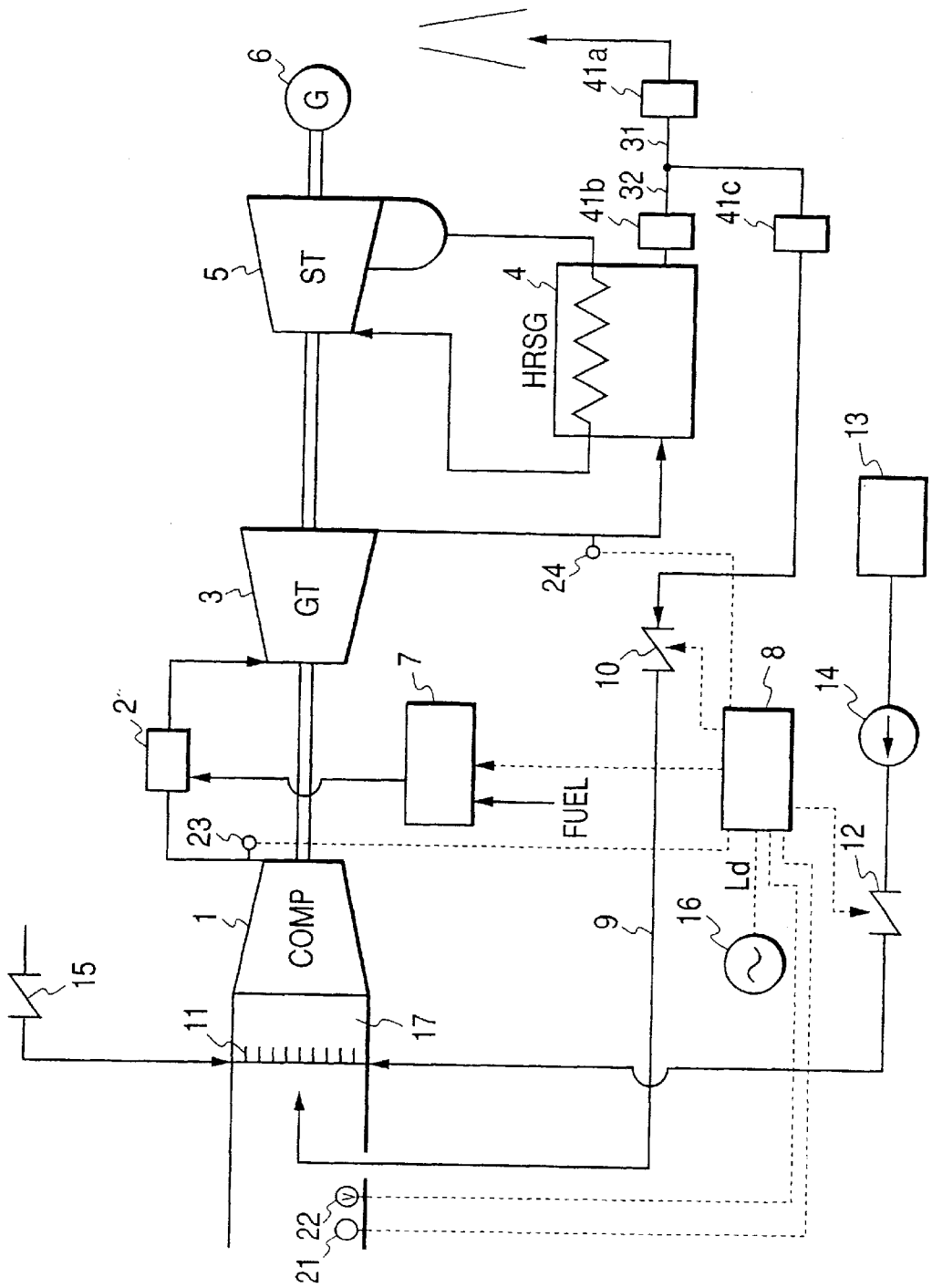
FIG. 17 is a schematic diagram of an embodiment of the present invention.

A ninth embodiment will be described with reference to FIG. 17.

Basically, the ninth embodiment can employ a structure of the eighth embodiment. According to the ninth embodiment, instead of the carbon dioxide gas removing unit 41a of the eighth embodiment, a carbon dioxide gas removing unit 41b is installed on the gas turbine exhaust gas path 32 between the gas turbine and the diverging portion to the recirculating means 9.

The gas turbine exhaust gas emitted from the gas turbine 3 is supplied to the compressor 1 through the recirculating means 9. Mixing gas comprising air and recirculated exhaust gas is introduced to the compressor 1 so as to raise the pressure. The mixing gas discharged from the compressor 1 and fuel are introduced to the gas turbine chamber 2 and burnt together. As a result, gas turbine exhaust gas having a higher concentration of carbon dioxide than a plain gas turbine having no recirculating means is discharged from the gas turbine chamber 2 so as to drive the gas turbine 3, The gas turbine exhaust gas having a high concentration of carbon dioxide is introduced to the carbon dioxide gas removing unit 41b so as to reduce the concentration of the carbon dioxide gas. A part of the gas turbine exhaust gas in which the concentration of carbon dioxide is reduced is diverged to the recirculating means 9 and the remainder is emitted to the air through a stack or the like.

In addition to the basic effect of the aforementioned eighth embodiment, as compared to a case when the carbon dioxide gas removing means 41a is installed on the recirculating means or exhaust gas path 31, a larger amount of higher concentration carbon dioxide gas can be supplied to the carbon dioxide gas removing unit 41b. Therefore, the carbon dioxide gas capture rate per unit area of the carbon dioxide gas removing unit 41b is increased, so that the carbon dioxide gas removing efficiency can be improved. If not so high an efficiency is demanded, the size of the carbon dioxide gas removing unit 41 can be reduced while ensuring a desired performance.

A tenth embodiment will be described with reference to FIG. 17.

Basically, the tenth embodiment can employ a structure of the eighth embodiment. According to the tenth embodiment, instead of the carbon dioxide gas removing unit 41a of the eighth embodiment, a carbon dioxide gas removing unit 41c is installed as the recirculating means 9.

The gas turbine exhaust gas emitted from the gas turbine 3 is supplied to the upstream of the compressor 1 through a recirculating means 9. Mixing gas comprising air and recirculated exhaust gas is introduced to the compressor 1 so as to raise the pressure. The mixing gas discharged from the compressor 1 and fuel are introduced to the gas turbine chamber 2 and burnt together. As a result, gas turbine exhaust gas having a higher concentration of carbon dioxide than a plain gas turbine having no recirculating means is discharged from the gas turbine chamber 2 so as to drive the gas turbine 3. A part of the gas turbine exhaust gas having a high concentration of carbon dioxide is diverged to the recirculating means 9 and the remainder thereof is emitted to the air through a stack or the like. The diverged exhaust gas to the recirculating means 9 is introduced to the carbon dioxide gas removing unit 41c, in which the concentration of the carbon dioxide is reduced. After the concentration of the carbon dioxide is reduced, the gas turbine exhaust gas is supplied to the compressor 1 again.

As described above, in addition to the basic effect of the eight embodiment, it is unnecessary to install the carbon dioxide gas removing unit 41 producing a pressure loss in a path for discharging the gas turbine exhaust gas to the air, thereby contributing to a high efficiency operation of the gas turbine. Further, the carbon dioxide gas removing unit 41c can be installed easily as well as when it is additionally installed on an existing gas turbine plant. Further, because the carbon dioxide gas removing unit 41c is installed separately from a system in which the gas turbine exhaust gas always flows, in the gas turbine plant using the recirculating means if necessary, the maintenance thereof is facilitated. Even in a case when the maintenance work on the carbon dioxide gas removing unit 41c is carried out, it is possible to carry out the maintenance work with the gas turbine operation being continued by shutting down the gas turbine exhaust gas flowing into the recirculating line.

According to the present invention, it is possible to provide an exhaust gas recirculation type gas turbine apparatus having a wide partial load operation range, which can be efficiently operated.

It is further understood by those skilled in the art that the foregoing description is a preferred embodiment of the disclosed device and that various changes and modifications may be made in the invention without departing from the spirit and scope thereof.

What is claimed is:

1. An operation method of exhaust gas recirculation type gas turbine apparatus comprising the steps of: compressing air in a compressor; burning the compressed air and fuel in a combustion chamber; driving a gas turbine with gas turbine exhaust gas from said combustion chamber; recirculating a part of said gas turbine exhaust gas to an intake of said compressor through a recirculation path; adjusting an amount of gas turbine exhaust gas to be returned to the intake of said compressor corresponding to a change in the load of said gas turbine; controlling said recirculation amount corresponding to the load so as to suppress a change in the combustion temperature of the combustion chamber in a gas turbine load of the range of 50%–80%; and introducing liquid droplets into the compressor so as to suppress a rise of the temperature of the compression air at an exit of the compressor.

* * * * *